United States Patent
Golitschek Edler von Elbwart et al.

(10) Patent No.: US 10,342,026 B2
(45) Date of Patent: Jul. 2, 2019

(54) RATE MATCHING FOR A MACHINE TYPE COMMUNICATION CHANNEL IN TIME DIVISION DUPLEX

(71) Applicant: Panasonic Intellectual Property Corporation of America, Torrance, CA (US)

(72) Inventors: Alexander Golitschek Edler von Elbwart, Hessen (DE); Chi Gao, Beijing (CN); Lilei Wang, Beijing (CN); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/563,925

(22) PCT Filed: Apr. 17, 2015

(86) PCT No.: PCT/CN2015/076870
§ 371 (c)(1),
(2) Date: Oct. 2, 2017

(87) PCT Pub. No.: WO2016/165126
PCT Pub. Date: Oct. 20, 2016

(65) Prior Publication Data
US 2018/0132257 A1     May 10, 2018

(51) Int. Cl.
*H04W 72/12*    (2009.01)
*H04L 5/14*    (2006.01)
(Continued)

(52) U.S. Cl.
CPC ......... *H04W 72/121* (2013.01); *H04L 5/0044* (2013.01); *H04L 5/14* (2013.01);
(Continued)

(58) Field of Classification Search
CPC ..... H04W 72/121; H04W 4/70; H04W 72/04; H04W 8/22; H04W 24/10; H04W 28/04;
(Continued)

(56) References Cited

U.S. PATENT DOCUMENTS 9,876,615 B2    1/2018 You et al.
2005/0188129 A1*    8/2005 Abdelilah ............... G06F 13/28
710/52
(Continued)

FOREIGN PATENT DOCUMENTS

CN    101499895 A    8/2009
CN    101577690 A    11/2009
(Continued)

OTHER PUBLICATIONS

3GPP TR 36.888 V12.0.0, "3$^{rd}$ Generation Partnership Project; Technical Specification Group Radio Access Network; Study on provision of low-cost Machine-Type Communications (MTC) User Equipments (UEs) based on LTE (Release 12)," Jun. 2013, 55 pages.
(Continued)

*Primary Examiner* — Wutchung Chu
(74) *Attorney, Agent, or Firm* — Seed IP Law Group LLP

(57) ABSTRACT

The present invention relates to transmitting and receiving data in a wireless communication system employing time division duplex, and in particular to a rate matching for the channels which are mapped onto special subframes such as uplink/downlink switching subframes in TDD. Accordingly, at the transmitter, a data block is stored in a memory unit which is to be operated as a circular buffer, the data block is transmitted in a plurality of subframes including special subframes, a special subframe containing an uplink portion and a downlink portion separated from each other by a switching portion; and before the transmission a rate match-
(Continued)

ing is performed by mapping the stored data block onto the plurality of subframes using the circular buffer, wherein the mapping of bits onto two different special subframes starts from different respective positions in the circular buffer. Moreover, a corresponding receiving apparatus and a transmitting and receiving method are provided.

21 Claims, 10 Drawing Sheets

(51) Int. Cl.
*H04W 72/00* (2009.01)
*H04W 72/04* (2009.01)
*H04L 5/00* (2006.01)
*H04W 4/70* (2018.01)

(52) U.S. Cl.
CPC ......... *H04L 5/1469* (2013.01); *H04W 72/005* (2013.01); *H04W 72/0446* (2013.01); *H04W 4/70* (2018.02); *H04W 72/0406* (2013.01)

(58) Field of Classification Search
CPC . H04W 72/042; H04W 8/24; H04W 72/0406; H04W 72/0446; H04W 72/1289; H04L 5/0044; H04L 5/14; H04L 5/1469; H04B 17/24
See application file for complete search history.

(56) References Cited

U.S. PATENT DOCUMENTS

| | | | | |
|---|---|---|---|---|
| 2009/0028129 | A1* | 1/2009 | Pi | H04L 1/0013 370/351 |
| 2009/0103562 | A1* | 4/2009 | Frederiksen | H04W 28/18 370/468 |
| 2009/0125774 | A1* | 5/2009 | Kim | H04L 1/1819 714/748 |
| 2010/0050034 | A1* | 2/2010 | Che | H04L 1/1845 714/748 |
| 2010/0074448 | A1* | 3/2010 | Park | H04J 13/00 380/287 |
| 2011/0280186 | A1* | 11/2011 | Rasquinha | H03M 13/275 370/328 |
| 2012/0110406 | A1* | 5/2012 | Sun | H04L 1/0068 714/751 |
| 2012/0287828 | A1* | 11/2012 | Chen | H04L 1/1614 370/280 |
| 2013/0258913 | A1* | 10/2013 | Challa | H04J 3/06 370/280 |
| 2014/0078978 | A1* | 3/2014 | Cheng | H04L 5/0053 370/329 |
| 2014/0334392 | A1 | 11/2014 | Gage et al. | |
| 2015/0173102 | A1* | 6/2015 | Ruiz Delgado | H04L 1/1864 370/280 |
| 2015/0215087 | A1* | 7/2015 | Park | H04B 7/024 370/252 |
| 2015/0280876 | A1 | 10/2015 | You et al. | |
| 2017/0150501 | A1* | 5/2017 | Park | H04L 1/1861 |
| 2017/0257849 | A1* | 9/2017 | Oketani | H04W 28/04 |
| 2018/0014283 | A1* | 1/2018 | You | H04L 5/0094 |
| 2018/0123741 | A1 | 5/2018 | You et al. | |

FOREIGN PATENT DOCUMENTS

| | | |
|---|---|---|
| CN | 102137500 A | 7/2011 |
| WO | 2014/077577 A1 | 5/2014 |
| WO | 2014/110725 A1 | 7/2014 |

OTHER PUBLICATIONS

3GPP TS 36.211 V8.9.0, "3$^{rd}$ Generation Partnership Project; Technical Specification Group Radio Access Network; Evolved Universal Terrestrial Radio Access (E-UTRA); Physical Channels and Modulation (Release 8)," Dec. 2009, 83 pages.
3GPP TS 36.212 V8.6.0, "3$^{rd}$ Generation Partnership Project; Technical Specification Group Radio Access Network; Evolved Universal Terrestrial Radio Access (E-UTRA); Multiplexing and channel coding (Release 8)," Mar. 2009, 59 pages.
3GPP TS 36.213 V11.1.0, "3$^{rd}$ Generation Partnership Project; Technical Specification Group Radio Access Network; Evolved Universal Terrestrial Radio Access (E-UTRA); Physical layer procedures (Release 11)," Dec. 2012, 160 pages.
3GPP TS 36.321 V12.5.0, "3$^{rd}$ Generation Partnership Project; Technical Specification Group Radio Access Network; Evolved Universal Terrestrial Radio Access (E-UTRA); Medium Access Control (MAC) protocol specification (Release 12)," Mar. 2015, 77 pages.
Ericsson, "Revised WI: Further LTE Physical Layer Enhancements for MTC," RP-150492, 3GPP TSG RAN Meeting #67, Agenda Item: 11.3.2, Shanghai, China, Mar. 9-12, 2015, 9 pages.
International Search Report, dated Jan. 18, 2016, for corresponding International Application No. PCT/CN2015/076870, 2pages.
Love et al., "Downlink Control channel Design for 3GPP LTE," *Wireless Communications and Networking Conference,* IEEE, Dec. 31, 2008, 6 pages.
3GPP TS 36.211 V12.4.0, "3rd Generation Partnership Project; Technical Specification Group Radio Access Network; Evolved Universal Terrestrial Radio Access (E-UTRA); Physical channels and modulation (Release 12)," Dec. 2014, 124 pages.
3GPP TS 36.212 V12.4.0, "3rd Generation Partnership Project; Technical Specification Group Radio Access Network; Evolved Universal Terrestrial Radio Access (E-UTRA); Multiplexing and channel coding (Release 12)," Mar. 2015, 94 pages.
3GPP TS 36.213 V12.4.0, "3rd Generation Partnership Project; Technical Specification Group Radio Access Network; Evolved Universal Terrestrial Radio Access (E-UTRA); Physical layer procedures (Release 12)," Dec. 2014, 225 pages.
Extended European Search Report, dated Oct. 31, 2018, for European Application No. 15888831.3-1219 / 3284205, 12 pages.
Notice of Reasons for Rejection, dated Sep. 25, 2018, for the related Japanese Patent Application No. 2017-545727, 36 pages.
Panasonic, "Consideration on repeated transmission in TDD," R1-151661, 3GPP TSG RAN WG1 Meeting #80bis, Agenda Item: 7.2.12, Belgrade, Serbia, Apr. 20-24, 2015, 6 pages.

* cited by examiner

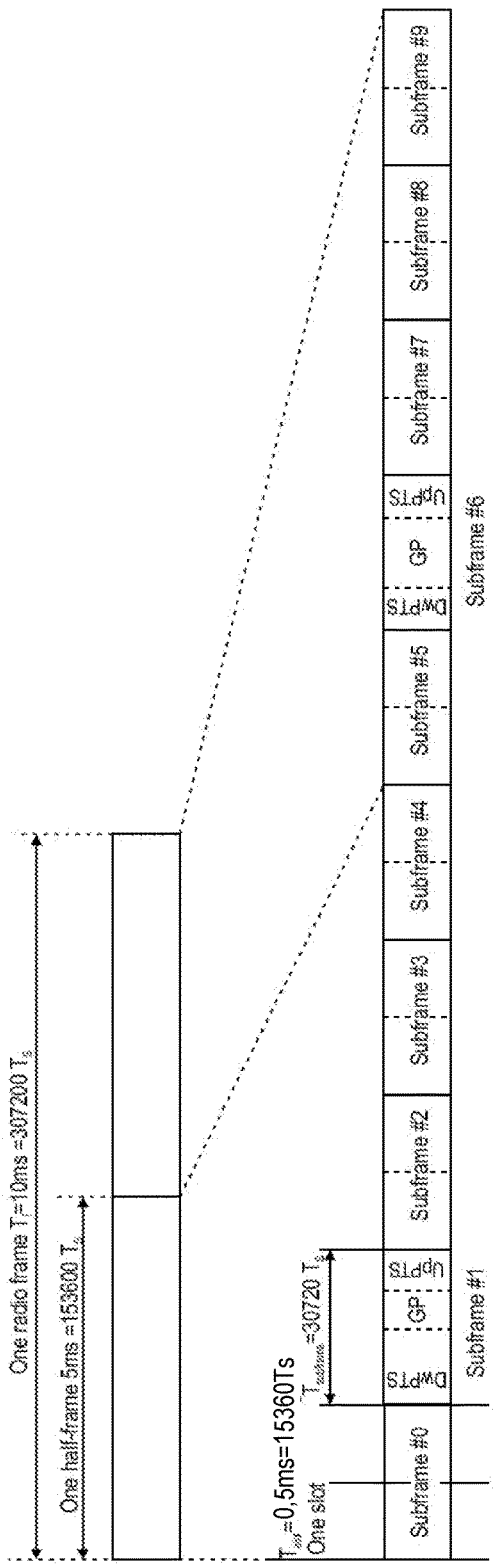

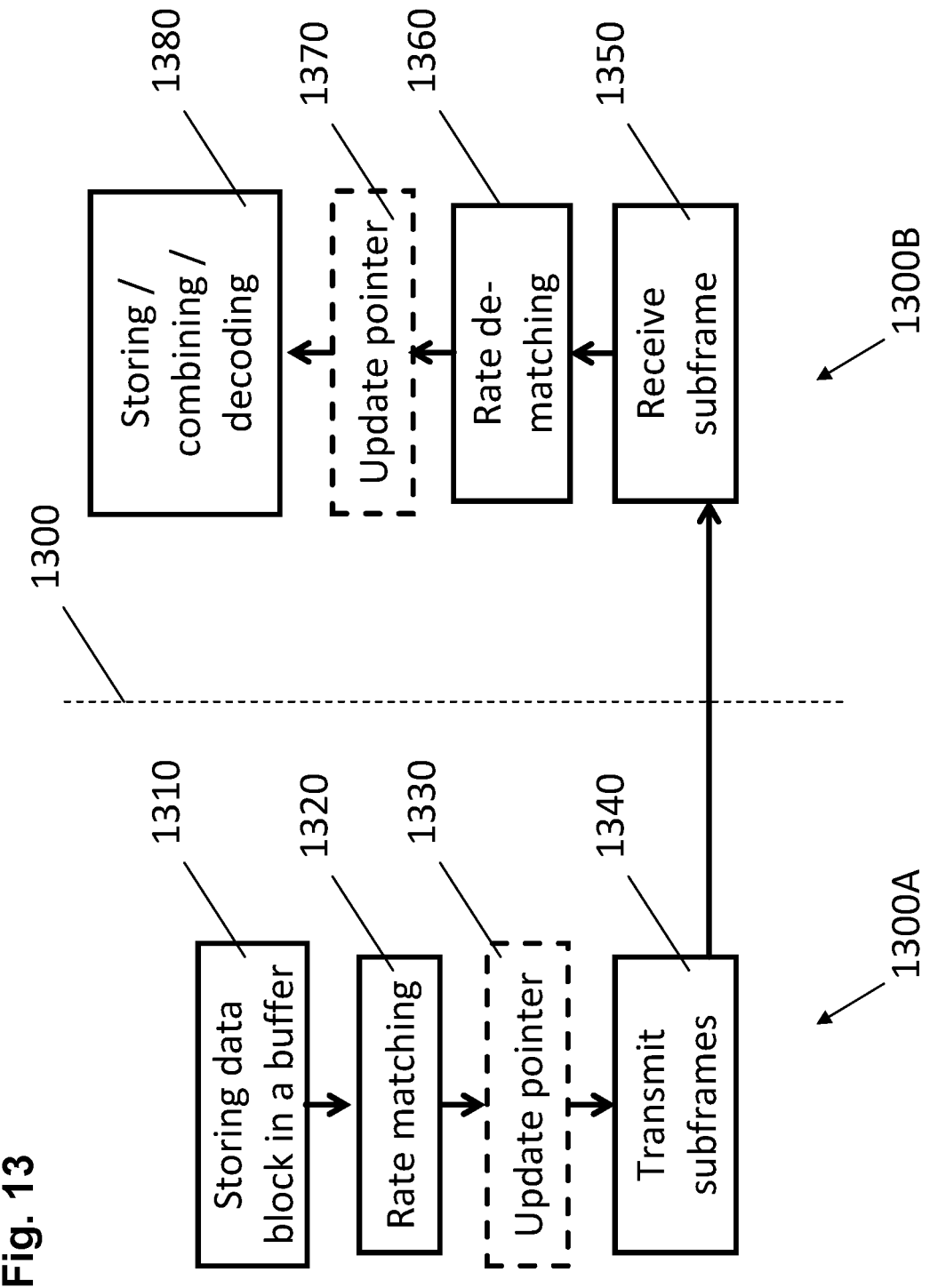

RATE MATCHING FOR A MACHINE TYPE COMMUNICATION CHANNEL IN TIME DIVISION DUPLEX

BACKGROUND

Technical Field

The present invention relates to transmission and reception of data in a wireless communication system and in particular to a rate matching using cyclic buffer.

Description of the Related Art

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, 3GPP introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g., parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

Component Carrier Structure in LTE (Release 8)

The downlink component carrier of a 3GPP LTE (Release 8 and further) is subdivided in the time-frequency domain in so-called subframes. In 3GPP LTE (Release 8 and further) each subframe is divided into two downlink slots, one of which is shown in FIG. 3. The first downlink slot comprises the control channel region (PDCCH region) within the first OFDM symbols. Each subframe consists of a given number of OFDM symbols in the time domain (12 or 14 OFDM symbols in 3GPP LTE, Release 8 and further), wherein each OFDM symbol spans over the entire bandwidth of the component carrier. The OFDM symbols thus each consists of a number of modulation symbols transmitted on respective $N_{RB}^{DL} \times N_{SC}^{RB}$ subcarriers. Assuming a multi-carrier communication system, e.g., employing OFDM, as for example used in 3GPP Long Term Evolution (LTE), the smallest unit of resources that can be assigned by the scheduler is one "resource block". A physical resource block (PRB) is defined as $N_{sumb}^{DL}$ consecutive OFDM symbols in the time domain (e.g., 7 OFDM symbols) and $N_{SC}^{RB}$ consecutive subcarriers in the frequency domain as exemplified in FIG. 3 (e.g., 12 subcarriers for a component carrier). In 3GPP LTE (Release 8), a physical resource block thus consists of $N_{symb}^{DL} \times N_{SC}^{RB}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One subframe consists of two slots, so that there are 14 OFDM symbols in a subframe when a so-called "normal" CP (cyclic prefix) is used, and 12 OFDM symbols in a subframe when a so-called "extended" CP is used. For sake of terminology, in the following the time-frequency resources equivalent to the same $N_{SC}^{RB}$ consecutive subcarriers spanning a full subframe is called a "resource block pair", or equivalent "RB pair" or "PRB pair".

The term "component carrier" refers to a combination of several resource blocks in the frequency domain. In future releases of LTE, the term "component carrier" is no longer used; instead, the terminology is changed to "cell", which refers to a combination of downlink and optionally uplink resources. The linking between the carrier frequency of the downlink resources and the carrier frequency of the uplink resources is indicated in the system information transmitted on the downlink resources.

Similar assumptions for the component carrier structure apply to later releases too.

Time Division Duplex—TDD

LTE can operate in Frequency-Division-Duplex (FDD) and Time-Division-Duplex (TDD) modes in a harmonized framework, designed also to support the evolution of TD-SCDMA (Time-Division Synchronous Code Division Multiple Access). TDD separates the uplink and downlink transmissions in the time domain, while the frequency may stay the same.

The term "duplex" refers to bidirectional communication between two devices, distinct from unidirectional communication. In the bidirectional case, transmissions over the link in each direction may take place at the same time ("full duplex") or at mutually exclusive times ("half duplex").

For TDD in the unpaired radio spectrum, the basic structure of RBs and REs is depicted in FIG. 4, but only a subset of the subframes of a radio frame are available for downlink transmissions; the remaining subframes are used for uplink transmissions, or for special subframes. Special subframes are important to allow uplink transmission timings to be advanced, so as to make sure that transmitted signals from the UEs (i.e., uplink) arrive roughly at the same time at the eNodeB. Since the signal propagation delay is related to the distance between transmitter and receiver (neglecting reflection and other similar effects), this means that a signal transmitted by a UE near the eNodeB travels for a short time than the signals transmitted by a UE far from the eNodeB. In order to arrive at the same time, the far UE has to transmit its signal earlier than the near UE, which is solved by the so-called "timing advance" procedure in 3GPP systems. In TDD this has the additional circumstance that the transmission and reception occur on the same carrier frequency, i.e., downlink and uplink need to be duplexed in time domain. While a UE far from the eNodeB needs to start uplink transmission earlier than the near UE, conversely, a downlink signal is received by a near UE earlier than by the far UE. In order to be able to switch the circuitry from DL reception to UL transmission, guard time is defined in the special subframe. To additionally take care of the timing advance problem, the guard time for a far UE needs to be longer than for a near UE.

This TDD structure is known as "Frame Structure Type 2" in 3GPP LTE Release 8 and later, of which seven different uplink-downlink configurations are defined, which allow a variety of downlink-uplink ratios and switching periodicities. FIG. 6 illustrates the Table with the 7 different TDD uplink-downlink configurations, indexed from 0-6, where "D" shall indicate a downlink subframe, "U" an uplink subframe and "S" a special subframe. As can be seen therefrom, the seven available TDD uplink-downlink configurations can provide between 40% and 90% of downlink subframes (when, for simplicity, counting a special subframe as a downlink subframe, since part of such a subframe is available for downlink transmission).

FIG. 4 shows the frame structure type 2, particularly for a 5 ms switch-point periodicity, i.e., for TDD configurations 0, 1, 2 and 6.

FIG. 4 illustrates a radio frame, being 10 ms in length, and the corresponding two half-frames of 5 ms each. The radio frame consists of 10 subframes with each 1 ms, where each of the subframes is assigned the type of uplink (U), downlink (D) or special (S), as defined by one of the Uplink-downlink configurations according to the table of FIG. 5.

As can be appreciated from FIG. 5, subframe #1 is always a Special subframe, and subframe #6 is a Special subframe for TDD configurations 0, 1, 2 and 6; for TDD configurations 3, 4 and 5, subframe #6 is destined for downlink. Special subframes include three fields: DwPTS (Downlink Pilot Time Slot), the GP (Guard Period) and UpPTS (Uplink Pilot Time Slot). They are used to separate uplink and downlink subframes. In the special subframes, uplink and downlink data may be transmitted in the respective subframe fields UpPTS and DwPTS, respectively. They are separated by a guard period also called downlink-uplink switching point. Uplink and downlink transmission durations in this irregular subframe S are reduced in comparison to a normal subframe implying that less bits for word error correction redundancy can be employed for a given transport block size or the transport block size itself is to be reduced.

In time division duplex mode the subframes in a radio frame are assigned to uplink or downlink in accordance with a TDD configuration, one of the seven TDD configurations shown in FIG. 5. These configurations differ from each other by the number and location of the uplink (U) and downlink (D) subframes as well as the special subframes for downlink-uplink switching in the TDD operation (S).

The following Table shows information on the special subframe and in particular lists the lengths of DwPTS (Downlink Pilot Time Slot) and of UpPTS (Uplink Pilot Time Slot) as a multiple of the sample time $T_s=(1/30720)$ ms as defined for 3GPP LTE Release 11. The GP (Guard Period) can be derived by subtracting the relevant DwPTS and UpPTS lengths from the length (or number of samples) of the special subframe. The special subframe configuration is independent from the Uplink-Downlink configuration shown in FIG. 5, so that all combinations of those two configurations are possible.

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The TDD configuration applied in the system has an impact on many operations performed at the mobile station and base station, such as radio resource management (RRM) measurements, channel state information (CSI) measurements, channel estimations, PDCCH detection and HARQ timings.

In particular, the UE reads the system information to learn about the TDD configuration in its current cell, i.e., which subframe to monitor for measurement, for CSI measure and report, for time domain filtering to get channel estimation, for PDCCH detection, or for UL/DL ACK/NACK feedback.

Logical and Transport Channels

The MAC layer provides a data transfer service for the RLC layer through logical channels. Logical channels are either Control Logical Channels which carry control data such as RRC signaling, or Traffic Logical Channels which carry user plane data. Broadcast Control Channel (BCCH), Paging Control channel (PCCH), Common Control Channel (CCCH), Multicast Control Channel (MCCH) and Dedicated Control Channel (DCCH) are Control Logical Channels. Dedicated Traffic channel (DTCH) and Multicast Traffic Channel (MTCH) are Traffic Logical Channels.

Data from the MAC layer is exchanged with the physical layer through Transport Channels. Data is multiplexed into transport channels depending on how it is transmitted over the air. Transport channels are classified as downlink or uplink as follows. Broadcast Channel (BCH), Downlink Shared Channel (DL-SCH), Paging Channel (PCH) and Multicast Channel (MCH) are downlink transport channels, whereas the Uplink Shared Channel (UL-SCH) and the Random Access Channel (RACH) are uplink transport channels.

A multiplexing is then performed between logical channels and transport channels in the downlink and uplink respectively.

Layer 1/Layer 2 (L1/L2) Control Signaling

In order to inform the scheduled users about their allocation status, transport format and other data-related information (e.g., HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/2 control signaling needs only be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Note, that the number of RBs on which a user is allocated can be dynamic;

Carrier indicator, which is used if a control channel transmitted on a first carrier assigns resources that concern a second carrier, i.e., resources on a second carrier or resources related to a second carrier;

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g., an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple clusters (at least two non-contiguous sets of contiguous RBs). Multi-cluster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in its fields. The different DCI formats that are currently defined for LTE are as follows and described in detail in 3GPP TS 36.212, "Multiplexing and channel coding", section 5.3.3.1 (available at http://www.3gpp.org and incorporated herein by reference). For further information regarding the DCI formats and the particular information that is transmitted in the DCI, please refer to the technical standard or to LTE—The UMTS Long Term Evolution—From Theory to Practice, Edited by Stefanie Sesia, Issam Toufik, Matthew Baker, Chapter 9.3, incorporated herein by reference.

In order that the UE can identify whether it has received a PDCCH transmission correctly, error detection is provided by means of a 16-bit CRC appended to each PDCCH (i.e., DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", incorporated hereby by reference. The section describes how error detection is provided on DCI transmissions through a Cyclic Redundancy Check (CRC). A brief summary is given below.

The entire payload is used to calculate the CRC parity bits. The parity bits are computed and attached. In the case where UE transmit antenna selection is not configured or applicable, after attachment, the CRC parity bits are scrambled with the corresponding RNTI.

The scrambling may further depend on the UE transmit antenna selection, as apparent from TS 36.212. In the case where UE transmit antenna selection is configured and applicable, after attachment, the CRC parity bits are scrambled with an antenna selection mask and the corresponding RNTI. As in both cases the RNTI is involved in the scrambling operation, for simplicity and without loss of generality the following description of the embodiments simply refers to the CRC being scrambled (and descrambled, as applicable) with an RNTI, which should therefore be understood as notwithstanding e.g., a further element in the scrambling process such as an antenna selection mask.

Correspondingly, the UE descrambles the CRC by applying the "UE identity" and, if no CRC error is detected, the UE determines that PDCCH carries its control information intended for itself. The terminology of "masking" and "de-masking" is used as well, for the above-described process of scrambling a CRC with an identity.

The "UE identity" mentioned above with which the CRC of the DCI may be scrambled can also be a SI-RNTI (System Information Radio Network Temporary Identifier), which is not a "UE identity" as such, but rather an identifier associated with the type of information that is indicated and transmitted, in this case the system information. The SI-RNTI is usually fixed in the specification and thus known a priori to all UEs.

There are various types of RNTIs that are used for different purposes. The following tables taken from 3GPP 36.321 Chapter 7.1 shall give an overview of the various 16-bits RNTIs and their usages.

| Value (hexadecimal) | RNTI |
|---|---|
| 0000 | N/A |
| 0001-003C | RA-RNTI, C-RNTI, Semi-Persistent Scheduling C-RNTI, Temporary C-RNTI, TPC-PUCCH-RNTI and TPC-PUSCH-RNTI (see note) |
| 003D-FFF3 | C-RNTI, Semi-Persistent Scheduling C-RNTI, Temporary C-RNTI, TPC-PUCCH-RNTI and TPC-PUSCH-RNTI |
| FFF4-FFFC | Reserved for future use |
| FFFD | M-RNTI |
| FFFE | P-RNTI |
| FFFF | SI-RNTI |

Physical Downlink Control Channel (PDCCH) and Physical Downlink Shared Channel (PDSCH)

The physical downlink control channel (PDCCH) carries e.g., scheduling grants for allocating resources for downlink or uplink data transmission. Multiple PDCCHs can be transmitted in a subframe.

The PDCCH for the user equipments is transmitted on the first $N_{symb}^{PDCCH}$ OFDM symbols (usually either 1, 2 or 3 OFDM symbols as indicated by the PCFICH, in exceptional cases either 2, 3, or 4 OFDM symbols as indicated by the PCFICH) within a subframe, extending over the entire system bandwidth; the system bandwidth is typically equivalent to the span of a cell or component carrier. The region occupied by the first $N_{symb}^{PDCCH}$ OFDM symbols in the time domain and the $N_{RB}^{DL} \times N_{SC}^{RB}$ subcarriers in the frequency domain is also referred to as PDCCH region or control channel region. The remaining $N_{symb}^{PDSCH} = 2 \cdot N_{symb}^{DL} - N_{symb}^{PDCCH}$ OFDM symbols in the time domain on the $N_{RB}^{DL} \times N_{SC}^{RB}$ subcarriers in the frequency domain is referred to as the PDSCH region or shared channel region (see below).

For a downlink grant (i.e., resource assignment) on the physical downlink shared channel (PDSCH), the PDCCH assigns a PDSCH resource for (user) data within the same subframe. The PDCCH control channel region within a subframe consists of a set of CCE where the total number of CCEs in the control region of subframe is distributed throughout time and frequency control resource. Multiple CCEs can be combined to effectively reduce the coding rate of the control channel. CCEs are combined in a predetermined manner using a tree structure to achieve different coding rate.

On a transport channel level, the information transmitted via the PDCCH is also referred to as L1/L2 control signaling (for details on L1/L2 control signaling see above).

There is a particular predefined timing relation between uplink resource assignments received in a subframe and the corresponding uplink transmission in PUSCH. Details are given in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 8.0 "UE procedure for transmitting the physical uplink shared channel" incorporated herewith by reference. In particular, Table 8-2 of TS 36.213 defines the parameter k for the TDD configurations 0-6, where k indicates the positive offset of the target of an uplink resource allocation received in a subframe; for TDD configuration 0 there is additional definition of the timing for uplink subframes 3 and 8, omitted herewith for simplicity. For instance, the parameter k is 6 for subframe 1 of TDD configuration 1, meaning that an uplink resource allocation received in subframe 1 of TDD configuration 1 is intended for subframe 1+6=7 of TDD configuration 1, which indeed is an uplink subframe, etc.

Hybrid ARQ Schemes

A common technique for error detection and correction in packet transmission systems over unreliable channels is called hybrid Automatic Repeat request (HARQ). Hybrid ARQ is a combination of Forward Error Correction (FEC) and ARQ.

If a FEC encoded packet is transmitted and the receiver fails to decode the packet correctly (errors are usually checked by a CRC (Cyclic Redundancy Check)), the receiver requests a retransmission of the packet. Generally (and throughout this document) the transmission of additional information is called "retransmission (of a packet)", although this retransmission does not necessarily mean a transmission of the same encoded information, but could also mean the transmission of any information belonging to the packet (e.g., additional redundancy information).

Depending on the information (generally code-bits/symbols), of which the transmission is composed, and depending on how the receiver processes the information, the following Hybrid ARQ schemes are defined:

In Type I HARQ schemes, the information of the encoded packet is discarded and a retransmission is requested, if the receiver fails to decode a packet correctly. This implies that all transmissions are decoded separately. Generally, retransmissions contain identical information (code-bits/symbols) to the initial transmission.

In Type II HARQ schemes, a retransmission is requested, if the receiver fails to decode a packet correctly, where the receiver stores the information of the (erroneously received) encoded packet as soft information (soft-bits/symbols). This implies that a soft-buffer is required at the receiver. Retransmissions can be composed out of identical, partly identical or non-identical information (code-bits/symbols) according to the same packet as earlier transmissions. When receiving a retransmission the receiver combines the stored information from the soft-buffer and the currently received information and tries to decode the packet based on the combined information. (The receiver can also try to decode the transmission individually, however generally performance increases when combining transmissions.) The combining of transmissions refers to so-called soft-combining, where multiple received code-bits/symbols are likelihood combined and solely received code-bits/symbols are code combined. Common methods for soft-combining are Maximum Ratio Combining (MRC) of received modulation symbols and log-likelihood-ratio (LLR) combining (LLR combing only works for code-bits).

Type II schemes are more sophisticated than Type I schemes, since the probability for correct reception of a packet increases with every received retransmission. This increase comes at the cost of a required hybrid ARQ soft-buffer at the receiver. This scheme can be used to perform dynamic link adaptation by controlling the amount of information to be retransmitted. e.g., if the receiver detects that decoding has been "almost" successful, it can request only a small piece of information for the next retransmission (smaller number of code-bits/symbols than in previous transmission) to be transmitted. In this case it might happen that it is even theoretically not possible to decode the packet correctly by only considering this retransmission by itself (non-self-decodable retransmissions).

Type III HARQ schemes may be considered a subset of Type II schemes: In addition to the requirements of a Type II scheme each transmission in a Type III scheme must be self-decodable.

Synchronous HARQ means that the re-transmissions of HARQ blocks occur at pre-defined periodic intervals. Hence, no explicit signaling is required to indicate to the receiver the retransmission schedule.

Asynchronous HARQ offers the flexibility of scheduling re-transmissions based on air interface conditions. In this case some identification of the HARQ process needs to be signaled in order to allow for a correct combining and protocol operation. In 3GPP LTE systems, HARQ operations with eight processes are used. The HARQ protocol operation for downlink data transmission will be similar or even identical to HSDPA.

In uplink HARQ protocol operation there are two different options on how to schedule a retransmission. Retransmissions are either "scheduled" by a NACK (also referred to as a synchronous non-adaptive retransmission) or are explicitly scheduled by the network by transmitting a PDCCH (also referred to as synchronous adaptive retransmissions). In case of a synchronous non-adaptive retransmission the retransmission will use the same parameters as the previous uplink transmission, i.e., the retransmission will be signaled on the same physical channel resources, respectively uses the same modulation scheme/transport format.

Since synchronous adaptive retransmissions are explicitly scheduled via PDCCH, the eNodeB has the possibility to change certain parameters for the retransmission. A retransmission could be for example scheduled on a different frequency resource in order to avoid fragmentation in the uplink, or eNodeB could change the modulation scheme or alternatively indicate to the user equipment what redundancy version to use for the retransmission. It should be noted that the HARQ feedback (ACK/NACK) and PDCCH signaling occurs at the same timing. Therefore the user equipment only needs to check once whether a synchronous non-adaptive retransmission is triggered (i.e., only a NACK is received) or whether eNode B requests a synchronous adaptive retransmission (i.e., PDCCH is signaled).

HARQ and Control Signaling for TDD Operation

As explained above, transmission of downlink or uplink data with HARQ requires that ACKnowledgement ACK or Negative ACK be sent in the opposite direction to inform the transmitting side of the success or failure of the packet reception.

In case of FDD operation, acknowledgement indicators related to data transmission in a subframe n are transmitted in the opposite direction during subframe n+4, such that a one-to-one synchronous mapping exists between the instant at which the transport is transmitted and its corresponding acknowledgment. However, in the case of TDD operation, subframes are designated on a cell-specific basis as uplink or downlink or special (see next chapter), thereby constraining the times at which resource grants, data transmissions, acknowledgments and retransmissions can be sent in their respective directions. The LTE design for TDD therefore supports grouped ACK/NACK transmission to carry multiple acknowledgements within one subframe.

For uplink HARQ, the sending (in one downlink subframe) of multiple acknowledgements on the Physical Hybrid ARQ Indicator CHannel (PHICH) is not problematic since, when viewed from the eNodeB, this is not significantly different from the case in which single acknowledgements are sent simultaneously to multiple UEs. However, for downlink HARQ, if the asymmetry is downlink-biased, the uplink control signaling (PUCCH) formats of FDD are insufficient to carry the additional ACK/NACK information. Each of the TDD subframe configurations in LTE (see below, and FIG. 5) has its own such mapping predefined between downlink and uplink subframes for HARQ purposes, with the mapping being designed to achieve a balance between minimization of acknowledgment delay and an even distribution of ACK/NACKs across the available uplink subframes. Further details are provided in TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 7.3 incorporated herewith by reference.

TS 36.213 v11.1.0 "3rd Generation Partnership Project; Technical Specification Group Radio Access Network; Evolved Universal Terrestrial Radio Access (E-UTRA); Physical layer procedures (Release 11)" Chapter 10.1.3, incorporated herein by reference explains the TDD HARQ-ACK feedback procedure. Table 10.1.3-1 of TS 36.213 gives the downlink association set index for the ACK/NACK/DTX responses for the subframes of a radio frame, wherein the number in the boxes for the TDD configurations indicates the negative offset of the subframe which HARQ feedback is transported in said subframe. For instance, subframe 9 for TDD configuration 0 transports the HARQ feedback of subframe 9−4=5; subframe 5 of TDD configuration 0 being indeed a downlink subframe (see FIG. 5).

In HARQ operation, the eNB can transmit different coded version from the original TB in retransmissions so that the UE can employ incremental redundancy (IR) combining to get additional coding gain over the combining gain. However, in realistic systems, it is possible that the eNB transmits a TB to one specific UE on one resource segment, but the UE cannot detect the data transmission due to DL control information lost. In this case, IR combining will lead to very poor performance for decoding the retransmissions because the systematic data has not been available at the UE. To mitigate this problem the UE should feed back a third state, namely discontinuous transmission (DTX) feedback, to indicate that no TB is detected on the associated resource segment (which is different from NACK indicating the decoding failure).

Machine Type Communication

As LTE deployments evolve, operators strive to reduce the cost of overall network maintenance by minimizing the number of RATs. In this respect, Machine-Type Communications (MTC) devices is a market that is likely to continue expanding in the future.

Many MTC devices are targeting low-end (low cost, low data rate) applications that can be handled adequately by GSM/GPRS. Owing to the low cost of these devices and good coverage of GSM/GPRS, there is very little motivation for MTC device suppliers to use modules supporting the LTE radio interface.

As more and more MTC devices are deployed in the field, this naturally increases the reliance on GSM/GPRS networks. This will cost operators not only in terms of maintaining multiple RATs, but also prevent operators reaping the maximum benefit out of their spectrum (given the non-optimal spectrum efficiency of GSM/GPRS). With users and traffic becoming denser, using more spectral-efficient technologies, such as Long Term Evolution (LTE), allow the operators to utilize their spectrum in a much more efficient way.

Given the likely high number of MTC devices, the overall resource they will need for service provision may be correspondingly significant, and inefficiently assigned (for further details on objectives for MTC, see for example 3GPP, RP-150492 Ericsson: "Revised WI: Further LTE Physical Layer Enhancements for MTC", section 4, available at http://www.3gpp.org and incorporated herein by reference).

Approaches to lower the cost of LTE presently regard the volume of products as the primary reason. The impact of volume can be seen in two possible ways, depending on how low-cost MTC is developed. Firstly, if low-cost MTC may be very similar to mainline LTE and included in LTE chipsets, MTC has the benefit of the volume of LTE. Secondly, a low-cost MTC based on LTE may have significantly lower cost than mainline LTE. Although it appears not to have the volume benefit of LTE, the volume of MTC devices can be even larger due to a potentially greater number of supported MTC applications and scenarios.

Further considerations on low-cost MTC devices relate to an improved indoor coverage. A number of applications require indoor deployment of Machine Type Communication, MTC, devices, e.g., in an apartment basement, or on indoor equipment that may be close to the ground floor etc. These UEs would experience significantly greater penetration losses on the radio interface than normal LTE devices. This effectively means that indoor coverage should be readily available and reliable: i.e., should provide a significant improvement on existing coverage.

Additionally, regarding the power consumption of low-cost MTC devices it is noted that many applications require devices to have up to ten years of battery life. In this respect, presently available Power Save Modes appear not sufficient to achieve the envisaged battery life. In this respect, it is anticipated that further techniques are proposed to significantly cut down the power usage of MTC devices e.g., by optimizing signaling exchanges in the system, in order to realize battery life of up to ten years.

For improving indoor coverage (for low-cost MTC devices), recent developments have focused on an Enhanced Coverage, EC, mode that is applicable to UEs e.g., operating delay tolerant MTC applications. Another term is "Coverage Extension". The corresponding Work Item in 3GPP Release 12 "Low cost & enhanced coverage MTC UE for LTE" came to the conclusion that further complexity reduction of LTE devices for MTC can be achieved if additional complexity reduction techniques are supported, as apparent from the technical report TR 36.888, v12.0.0, "Machine-Type Communications (MTC) User Equipments (UEs)", available at www.3gpp.org and incorporated herein by reference. The technical report TR 36.888 concluded that a coverage improvement target of 15-20 dB for both FDD and TDD in comparison to a normal LTE footprint could be achieved to support the use cases where MTC devices are deployed in challenging locations, e.g., deep inside buildings, and to compensate for gain loss caused by complexity-reduction techniques. MTC coverage enhancements are now expected to be introduced in 3GPP Release 13.

In general, the MTC devices may be low complexity (LC) MTC devices (which basically forces the device to receive a TBS of 1000 bits or less as a result of buffer size limitations and other implementation limitations) or enhanced coverage (EC) devices which are supposed to support a large number of repetitions.

In other words, LC are Low Complexity devices which are meant to be inexpensive devices with limited buffer sizes/simple implementation etc. whereas the EC devices are the coverage enhanced device that should operate in challenging situations like in basement or far away from the cell center.

The general objective is to specify a new UE for MTC operation in LTE that allows for enhanced coverage and lower power consumption. Some of the additional objectives are given below:

Reduced UE bandwidth of 1.4 MHz in downlink and uplink.
Bandwidth reduced UEs should be able to operate within any system bandwidth.
Frequency multiplexing of bandwidth reduced UEs and non-MTC UEs should be supported.
The UE only needs to support 1.4 MHz RF bandwidth in downlink and uplink.
The allowed re-tuning time supported by specification (e.g., ~0 ms, 1 ms) should be determined by RAN4.
Reduced maximum transmit power.
The maximum transmit power of the new UE power class should be determined by RAN4 and should support an integrated PA implementation.
Reduced support for downlink transmission modes.
The following further UE processing relaxations can also be considered within this work item:
Reduced maximum transport block size for unicast and/or broadcast signaling.
Reduced support for simultaneous reception of multiple transmissions.
Relaxed transmit and/or receive EVM requirement including restricted modulation scheme. Reduced physical control channel processing (e.g., reduced number of blind decoding attempts).
Reduced physical data channel processing (e.g., relaxed downlink HARQ time line or reduced number of HARQ processes).
Reduced support for CQI/CSI reporting modes.
A relative LTE coverage improvement—corresponding to 15 dB for FDD—for the UE category/type defined above and other UEs operating delay-tolerant MTC applications with respect to their respective normal coverage shall be possible. At least some of the following techniques, which shall be applicable for both FDD and TDD, can be considered to achieve this:
Subframe bundling techniques with HARQ for physical data channels (e.g., PUSCH, PUSCH)
Elimination of use of control channels (e.g., PCFICH, PDCCH)
Repetition techniques for control channels (e.g., PBCH, PRACH, (E)PDCCH)
Either elimination or repetition techniques (e.g., PBCH, PHICH, PUCCH)
Uplink PSD boosting with smaller granularity than 1 PRB
Resource allocation using EPDCCH with cross-subframe scheduling and repetition (EPDCCH-less operation can also be considered)
New physical channel formats with repetition for SIB/RAR/Paging
A new SIB for bandwidth reduced and/or coverage enhanced UEs
Increased reference symbol density and frequency hopping techniques
Relaxed "probability of missed detection" for PRACH and initial UE system acquisition time for PSS/SSS/PBCH/SIBs can be considered as long as the UE power consumption impact can be kept on a reasonable level.
Spreading: Spreading refers to spreading of information across resources including time-frequency domain resources or even spreading using Scrambling (or Channelization) codes.

There can be also other techniques than those listed above. The amount of coverage enhancement should be configurable per cell and/or per UE and/or per channel and/or group of channels, such that different levels of coverage enhancements exist. The different levels of coverage enhancement could mean different level of CE techniques being applied to support the CE-device transmission and reception. Relevant UE measurements and reporting to support this functionality should be defined.

Early attempts to define the Enhanced Coverage mode have focused on modifications of the radio transmissions. In this respect, discussions have focused on repeated transmissions as being the main technique to improve the coverage. Repetitions can be applied to every channel for coverage improvement. An exemplary implementation of these repeated transmissions prescribes that the same data is transmitted across multiple sub-frames. Yet, it will become immediately apparent that these repeated transmissions will use more resources (time-frequency) than what is required for normal coverage UEs. RAN1 indicated that the transport block size used for transmission to the MTC devices will be less than 1000 bits.

Thus, the efficient resource utilization is an important factor especially in the TDD systems in which the time domain resources are shared by both uplink and downlink.

BRIEF SUMMARY

One non-limiting and exemplary embodiment provides apparatuses and methods for an efficient transmission and reception with rate matching which reduces unequal frequency of transmitting certain data portions caused by large multiples of data versions.

In one general aspect, the techniques disclosed here feature an apparatus for transmitting data in a wireless communication system employing time division duplex. The apparatus comprises a memory unit for storing a data block; a transmission unit for transmitting the data block in a plurality of subframes including special subframes, a special subframe containing an uplink portion and a downlink portion separated from each other by a switching portion; and a rate matching unit 1230 for mapping the stored data block onto the plurality of subframes using the circular buffer, wherein the mapping of bits onto two different special subframes starts from different respective positions in the circular buffer.

In another general aspect, the techniques disclosed here feature an apparatus for transmitting control data in a wireless communication system the apparatus comprising: a memory unit for storing a control data block and to be operated as a circular buffer; a transmission unit for transmitting the control data block in a plurality of subframes; and a rate matching unit for mapping the control data block onto the plurality of subframes using a circular buffer, wherein the mapping of bits onto two different subframes starts from different respective positions in the circular buffer.

In another general aspect, the techniques disclosed here feature an apparatus for receiving data in a wireless communication system employing time division duplex. The apparatus for receiving data according to an embodiment comprises a receiving unit for receiving the data block in a plurality of subframes including special subframes, a special subframe containing an uplink portion and a downlink portion separated from each other by a switching portion; a memory unit for storing data block versions received; and a rate de-matching unit for extracting the data block from the plurality of subframes into the memory unit using a circular buffer approach, wherein the de-mapping of bits from two different special subframes leads to different respective positions in the memory unit.

In one general aspect, the techniques disclosed here feature an apparatus for receiving control data in a wireless communication system the apparatus comprising: a receiving unit for receiving the control data block in a plurality of subframes; a memory unit for storing a control data block received; a rate de-matching unit for extracting the control data block from the plurality of subframes into the memory unit using a circular buffer approach, wherein the de-mapping of bits from two different subframes leads to different respective positions in the memory unit.

Moreover, the techniques disclosed here feature the corresponding methods for receiving and transmitting data in a wireless communication system.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

The above and other objects and features of the present invention will become more apparent from the following description and preferred embodiments given in conjunction with the accompanying drawings in which:

As can be seen above, depending on the TDD configurations only few subframes per radio frame are available for downlink control channel transmissions. This may result in a rather large number of radio frames necessary to convey communication in which large number of repetitions is applied such as MTC.

FIG. 4 is a schematic drawing illustrating the structure of a radio frame, being composed of 10 subframes for a 5 ms switch-point periodicity, FIG. 5 is a table showing the seven currently-standardized (static) TDD UL/DL configurations 0-6, the respective definitions of the 10 subframes and their switch-point periodicity, FIG. 13 is a flow diagram illustrating an exemplary transmitting and receiving method implementing the rate matching for an MTC channel.

DETAILED DESCRIPTION

When assuming transmissions with large number of repetitions (around 100) such as for MTC, the number of radio frames which is required for such transmissions may be large. The following table lists number of radio frames which is required for transmitting hundred repetitions when assuming the respective seven TDD configurations shown in FIG. 5. The second column of the table captures the number of radio frames if only downlink frames (D) are used, without using the special frames (S). The third column shows the number of radio frames required if both downlink and special subframes are usable for transmitting the repetitions. In this example it is assumed that a special subframe has 66% channel capacity of the downlink subframe, corresponding to a DwPTS length of $21952 \cdot T_s$ and assuming that the first two OFDM symbols of a downlink and special subframe are not available for transmitting the repetitions.

| TDD UL/DL configuration | If only D subframes are usable | If both D and S subframes are usable |
| --- | --- | --- |
| #0 | 50 | 30 |
| #1 | 25 | 19 |
| #2 | 17 | 14 |
| #3 | 17 | 15 |
| #4 | 15 | 14 |
| #5 | 13 | 12 |
| #6 | 34 | 24 |

Accordingly, it is beneficial to use the relevant portions of the switching subframes for transmission of the data since then the number of radio frames necessary for the transmission is reduced substantially. The reduction of the number of radio frames leads to the reduction of time necessary for acquisition of the data carried by these radio frames and thus also to reduction of the delay. This in turn leads to more data that can be conveyed in the same amount of time.

Figure 1:
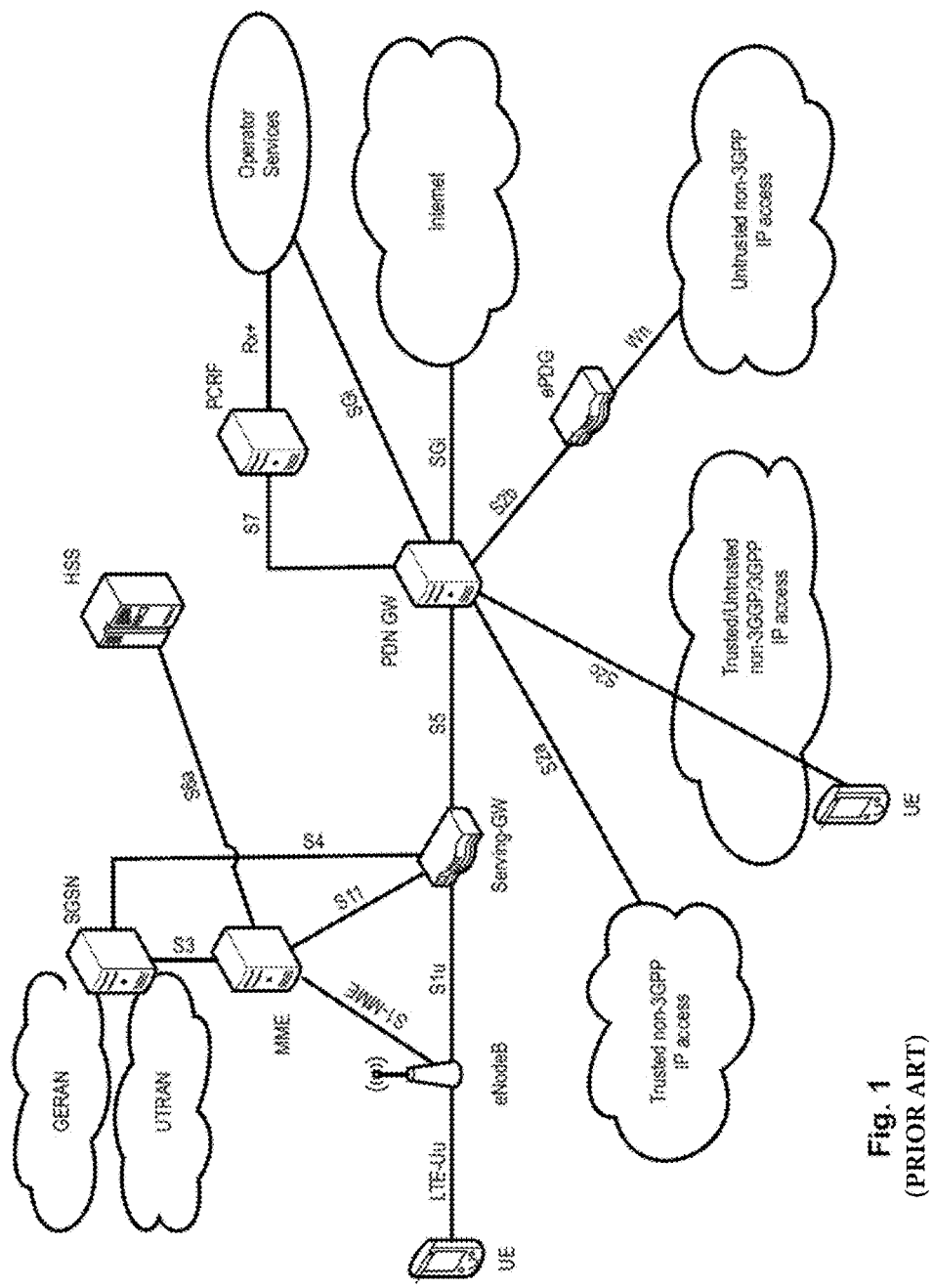
FIG. 1 is a block diagram showing an exemplary architecture of a 3GPP LTE system.
Figure 3:
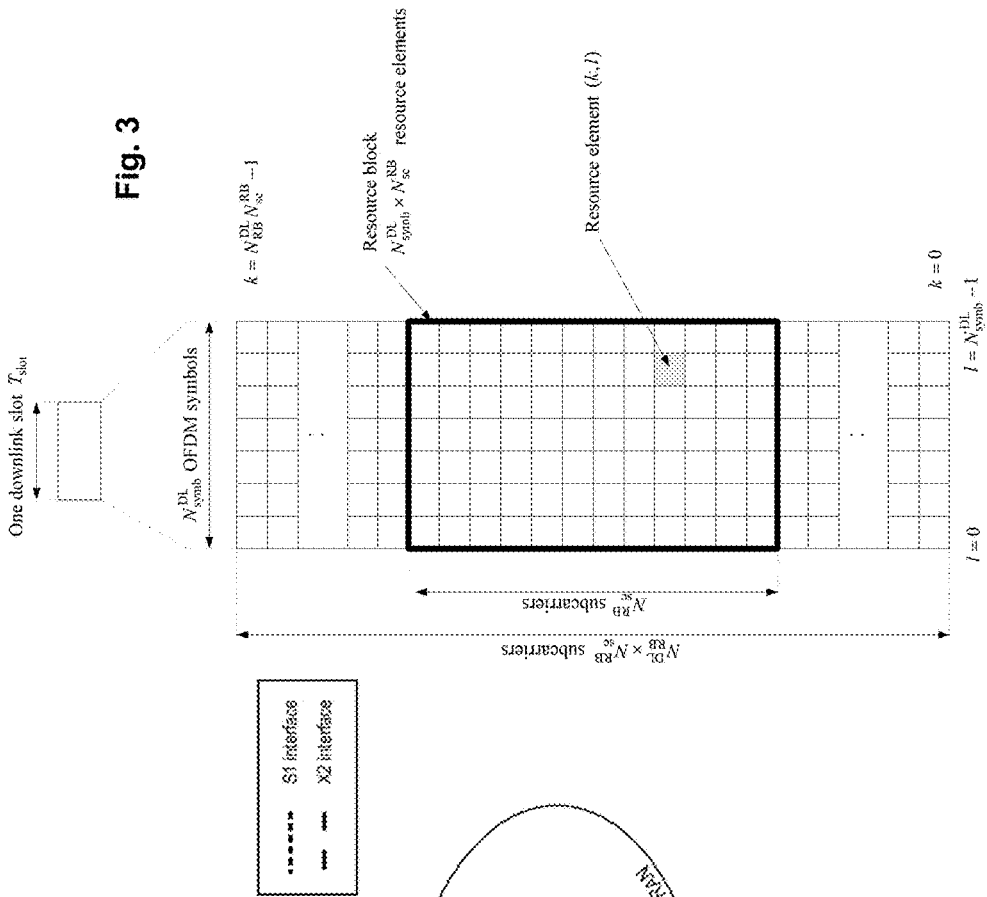
FIG. 3 is a schematic drawing showing an exemplary downlink resource grid of a downlink slot as defined for 3GPP LTE (as of Release 8/9)
Figure 2:
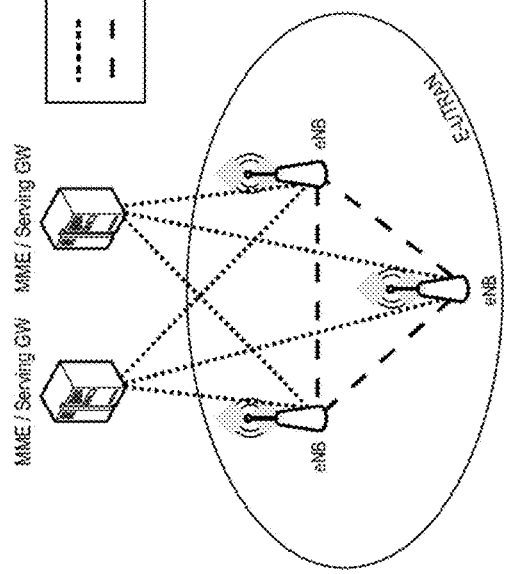
FIG. 2 is a block diagram showing an exemplary overview of the overall E-UTRAN architecture of 3GPP LTE.
Figure 6:
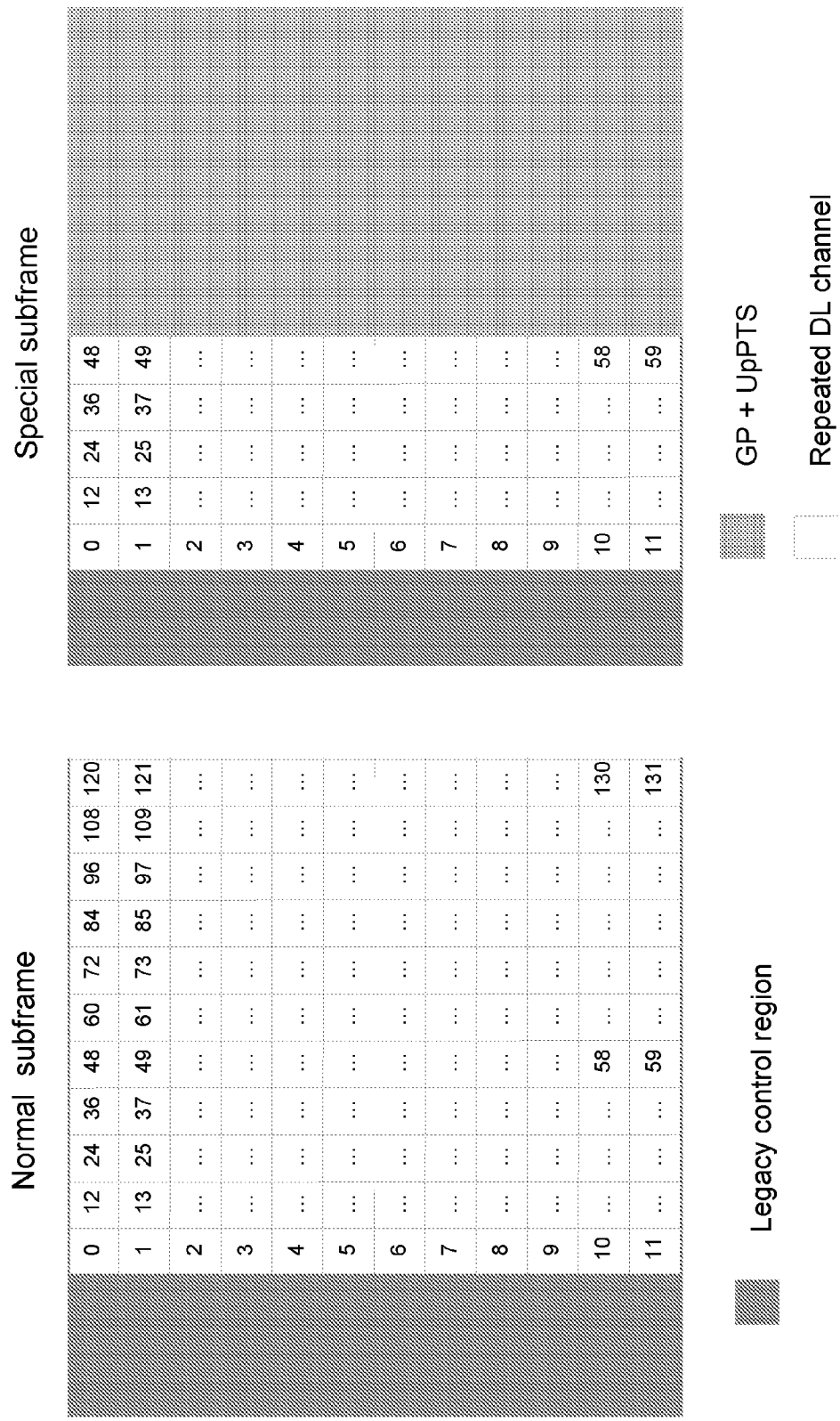
FIG. 6 is a schematic drawing showing an exemplary format of a downlink subframe and a special subframe.

FIG. 6 illustrates on the left-hand side the structure of a "normal" downlink subframe for 12 subcarriers (one physical resource block). The first three symbols of the first slot are used for control signaling (denoted as legacy control region in the figure) in this example. The remaining symbols (horizontal subdivision of the time-frequency resource grid) and subcarriers (vertical subdivision) may be used for transmission of data. On the right-hand side the structure of the special subframe is illustrated. The first two symbols of the first slot are used for control signaling (denoted as legacy control region in the figure) in this example. However, it is noted that the number of symbols in the control region is generally variable (configurable) in LTE and the above 3 and 2 symbols respectively are only an example.

The normal—uplink or downlink—subframes and the special subframe may all be used for conveying data, even though up to LTE Release 12 the special subframe can only be used to convey downlink data, but not uplink data. For instance, the data may be truncated (if necessary) and is transmitted in the normal downlink subframe and the DwPTS portion of the special subframe. In particular, bits 0 to 131 are transmitted in the downlink subframe whereas bits 0 to 59 are transmitted in the DwPTS portion of the special subframe.

In the above described scenario for MTC communication with a large number of repetitions, the first, downlink subframe may carry data and the second, special subframe (its downlink portion) may carry a repetition of the data. However, since the special subframe only provides 60 bits for transmission, the repetition can only be partial. It is noted that the above example does not take into account reference signal which would usually be also transmitted within some of the resource elements shown. Moreover, for the sake of simplicity, it is assumed here that one resource element carries only one bit which corresponds to application of the binary phase shift keying (BPSK). This may indeed be also the case especially for coverage enhancement cases if the channel conditions are low quality. However, a resource element may also carry more bits, for instance 2 bits of a QPSK modulation or 4 bits of a 16-QAM or the like.

The usage of the special subframes enables reduction of the number of radio frames necessary for the transmission of the data and its repetitions as demonstrated above.

On the other hand, if the above example and approach are used several times to convey the same transport block data, i.e., the 132 bits of coded data are mapped either to the corresponding 132 REs of a downlink subframe, or the 132 bits of the coded data are truncated (reduced) to the first 60 bits, which are then mapped to the 60 REs of the special subframe, then the first 60 bits of the data are transmitted more frequently than the remaining bits of the coded data. In other words, the mapping of the repetition onto the special subframes may lead to imbalanced repetition gain among the data coding bits. Such imbalanced repetition may generally lead to inferior decoding performance.

In order to overcome this inefficiency, in accordance with an embodiment, in different special subframes, the mapping of coded bits is starting from different respective bit positions in the repeated data. Advantageously, a circular buffer approach is adopted and the mapping of coded bits starts from different respective bit positions in the circular buffer in which the data to be repeated is stored.

Circular buffer may be implemented by means of a memory storing the data to be repeatedly transmitted and storing a pointer to a position within the data from which the bits are to be selected and mapped to the resources. The pointer is increased with each bit selected for the mapping onto the resources in a circular manner, i.e., when the pointer reaches the last bit of data, it passes to the first bit of data again. In particular, the consecutive bits are selected from the circular buffer to the extent that fits into the assigned physical resource (such as a downlink subframe or a special subframe). Then, the pointer is updated to point to the position immediately following the selected and mapped bits within the circular buffer.

The circular buffer can be beneficially combined with the forward error correcting (FEC) coding such as Turbo coding. One possibility is to repeat the data coded by the FEC coding. Alternatively, an operation of Incremental Redundancy (IR) may be enabled such as the one used by the HARQ in LTE as briefly described above. Then, different subsets of the coded data block may be selected for different transmissions of the packet. Contrary to the HARQ using IR, the repetitions for the MTC communication are not triggered by feedback from the receiving party. Rather, the mere repetitions of the same (coded) data are replaced by transmitting different versions of the same data. Correspondingly, the concept of Redundancy Version (RV) may be adopted, too. For instance, in the case of the first transmission of a coded block the RV is equal to 0. Optionally, a small amount of systematic bits may be punctured: instead of reading out data from the beginning of the systematic bit stream, the output of the circular buffer may start from a specified point—i.e., an offset may be applied. The starting point of extracting the bits from the circular buffer may also be configured according to a specific RV (RV=1, 2, 3 or more). In this sense, the RV is denoting a certain version corresponding to a transport block, where the RV index 0,1,2,3, . . . can be seen as pointing to different positions in the circular buffer.

Figure 7:
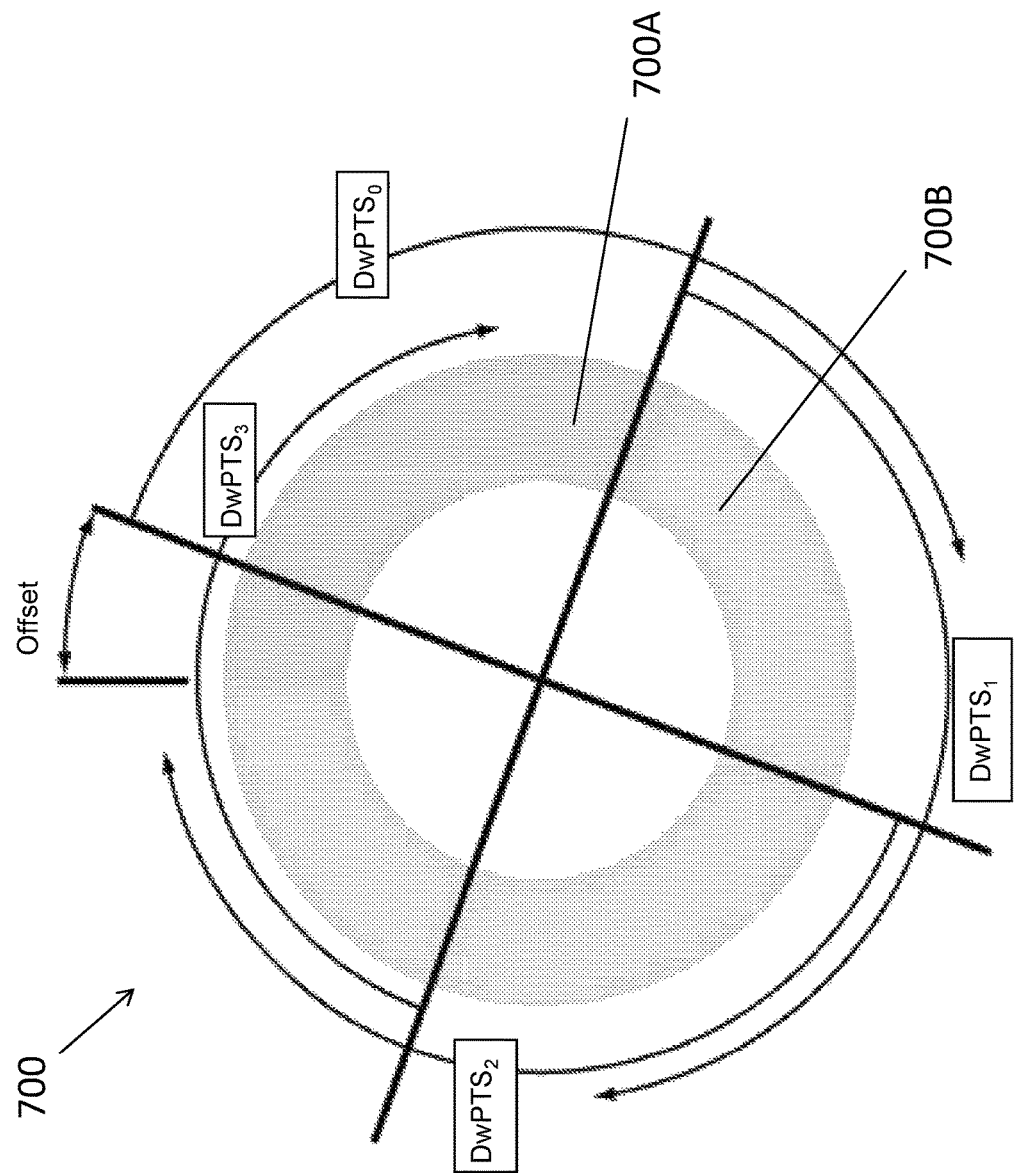
FIG. 7 is a schematic drawing illustrating reading the data to be mapped to special subframes from a circular buffer.

Advantageously, in subsequent (consecutive) special frames, different redundancy versions are used. This is exemplarily illustrated in FIG. 7. FIG. 7 shows a circular buffer 700 including a systematic data portion 700A and a parity data portion 700B. For instance, the systematic portion is formed by the data to be transmitted (corresponding to RV=0) whereas the parity data portion is formed by the following redundancy versions such as RV=1, 2, 3, etc. consisting of parity bits generated by the FEC coder. The portions corresponding to particular redundancy versions may be self-decodable, which means that data of each redundancy version can be decoded without using data from other versions, if there are no errors. Such an ordered structure of systematic and parity bits is currently used for turbo-coded channel in LTE, while for convolutionally-coded channels there is no such distinction of systematic and parity bits. In that case, there are no systematic bits, so that for the broad applicability it is more suitable to just refer to different portions of data within the circular buffer. The present invention is not limited to the application of codes presently used in the LTE standard, namely Turbo codes and convolutional codes. Rather, any coding may be applied such as LDPC (low-density parity check) or BCH or anything else. In this application, the term "redundancy version" or "version" thus refers to systematic (uncoded) data portion as well as to data portion corresponding to coded bits.

In this example, the reading out of the circular buffer for mapping onto a special subframe starts with RV=0 and thus, from within a first portion (700A), which for turbo-coded channels may represent the systematic bits. An offset is applied so that the portion is read out from the position within the buffer starting at "Offset". In FIG. 7, a counter is used to store an indication of a pointer to the start of the next read-out of the circular buffer. In the present example, the counter may take four values DwPTS_1, DwPTS_2, DwPTS_3 and DwPTS_4. The DwPTS_0 corresponds to reading out the first portion starting from the position given by the Offset and may include some portion corresponding to RV=1 as illustrated by the first arrow, provided that a sufficient number bits can be transmitted (If the DwPTS is very short, the position of the RV=1 is possibly not reached. However, this situation is not very likely). This data is mapped to a first special subframe. DwPTS_1 corresponds to reading out the portion starting from the position in ¼ of the circle, i.e., portion in which the redundancy version RV=1 starts. The data read out and mapped onto a second special subframe following the first special subframe is illustrated by the second arrow and includes the data of redundancy version RV=1 and potentially a part of redundancy version RV=2. DwPTS_2 corresponds to reading out the portion starting from the position in ½ of the circle, i.e., portion in which the redundancy version RV=2 starts. The data read out and mapped onto a third special subframe following the second special subframe is illustrated by the third arrow and includes the data of redundancy version RV=2 and potentially a part of redundancy version RV=3. Finally, DwPTS_3 corresponds to reading out the portion starting from the position in ¾ of the circle, i.e., portion in which the redundancy version RV=3 starts. The data read out and mapped onto a fourth special subframe following the third special subframe is illustrated by the fourth arrow and includes the data of redundancy version RV=3 and potentially a part of the bits which were not included into the first special subframe (corresponding to offset) and possibly other part of the RV=0 data.

The present example shows mapping onto the downlink subframes. This is advantageous for the existing LTE TDD architecture, in which the downlink portion available in the special subframes is larger than the uplink portion and thus also more suitable to improve efficiency of MTC transmission with a large number of repetitions. However, the present disclosure is not limited to downlink and may also be applied to the uplink and to mapping uplink (user or control) data onto the uplink portions of the special subframes. Likewise, the present disclosure is not limited to a subframe where both downlink and uplink portions are present, and may also be applied to subframes where only a downlink portion or only an uplink portion is present. An example for such a structure is the case of having only the second half of a subframe available for downlink or uplink transmissions, respectively.

The circular buffer enables any predetermined (for instance configured by some control signaling) or predefined (for instance specified in a standard) number of repetitions in which the redundancy versions cyclically change (increment) for special frames following each other. With this approach, the special subframes include versions of the same data which are not the same and which are shifted with respect to each other so that each version is mapped onto the special subframes with substantially same frequency.

It is noted that in general, no initial offset is necessary, i.e., that the offset may be set to zero.

The number of redundancy version being four is also a mere example. In general, less or more redundancy versions may be applied. However, the number four for the redundancy versions provides an advantage that it is also used in HARQ in LTE so that the existing circuitry may possibly be reused.

This approach is applicable to data channels as well as to the control channels. In particular, the application of the circular buffer for mapping the control channels onto the subframes provides an advantage in connection with the MTC and especially coverage enhancement: even if the lowest-order modulation is used, the reliability of the data transmission and thus also the coverage may be enhanced by introducing the number of "repetitions", i.e., versions of the same control data transmitted.

Figure 8:
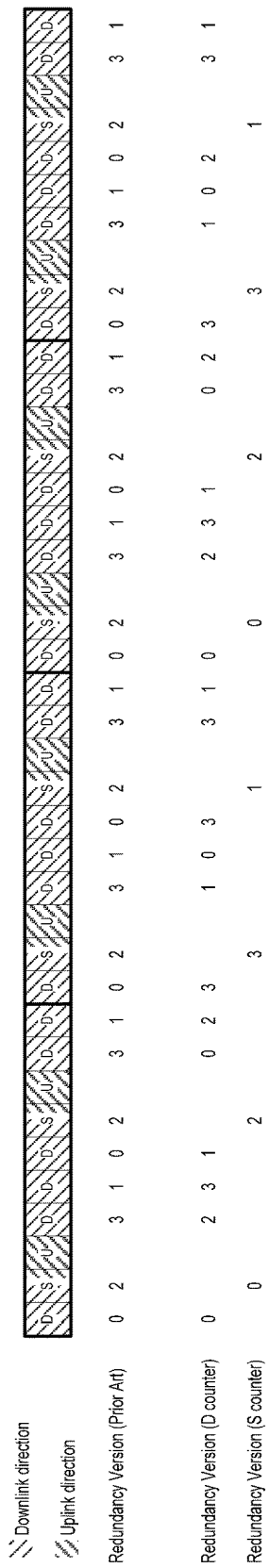
FIG. 8 is a schematic drawing illustrating usage of a counter index specific for special frames.

In the above example the counter for storing an indication of a pointer from which the data is to be read is separate for the special subframes and for the downlink subframes. This is further exemplified in FIG. 8. In FIG. 8, a sequence of radio frames with UL/DL TDD configuration 2 (cf. FIG. 5) is shown. There are 6 downlink subframes, 2 uplink subframes and two special subframes per radio frame. The redundancy version of the data mapped to the downlink and special frames is shown in the first row below the subframe representation. The values of a downlink counter and a special counter are shown in the respective second and third row below the redundancy version. In this figure, the redundancy versions are cyclically incremented in the order of RV=0, 2, 3 and 1, conform to the current state of the LTE specifications for uplink non-adaptive Hybrid ARQ. Nevertheless, the order is a matter of agreement and can be different.

In FIG. 8, the counter for the downlink subframes and the counter for special subframes are independent. For instance, the first radio frame includes the subframes D, S, U, D, D, D, S, U, D, D. The data in its four different versions are mapped onto the D and S frames, which results in the counter value for D subframes respectively 0, -, -, 2, 3, 1, -, -, 0, 2 and in the counter value for S frames respectively -, 0, -, -, -, -, 2-, -, -, wherein "-" denotes no change of the counter, even though it can also be interpreted as "not applicable" or "don't care". The S-frame counter increments with each S subframe onto which the data is mapped whereas the D-frame counter increments with each D subframe onto which the data is mapped. The increasing is in this example cyclically and sequentially repeating the predefined order 0, 2, 3, 1.

The redundancy version corresponding to the 10 subframes for the downlink would be as follows: 0, 2, -, 3, 1, 0, 2, -, 3, 1, if there was a counter common for the S and D frames and no further rules. However, in such case, the special subframes would always include a portion of redundancy version 2, causing that RV=2 would be always carried by less resources than other redundancy versions.

The above mentioned use of different redundancy version is advantageous since it provides additional combining diversity. However, the present disclosure is not limited to the versions of data being different redundancy versions. Rather, the versions of the data to be transmitted in the respective subframes may also be repetitions of the same data. The circular buffer in such case is filled with one version of the data and the mapping to the special frames starts from different bit positions within this data.

In general, the present disclosure is meant to cover any form of versions of the data. Apart from the above mentioned different redundancy versions or repetitions, any other versions such as differently interleaved versions of the same data are also possible. Moreover, the above examples show rate matching on a bit level. However, in general, the rate matching may also be performed on a modulation symbol level, i.e., for multiples of a bit.

As mentioned above, this approach may be applied to user data and/or to control data. Concerning the control data, already the introduction of the cyclic buffer and repetitions possibly with different versions may improve the performance. Even if the control data is mapped only to the downlink subframes, the application of the circular buffer for rate matching improves the reliability of transmission.

Figure 9:
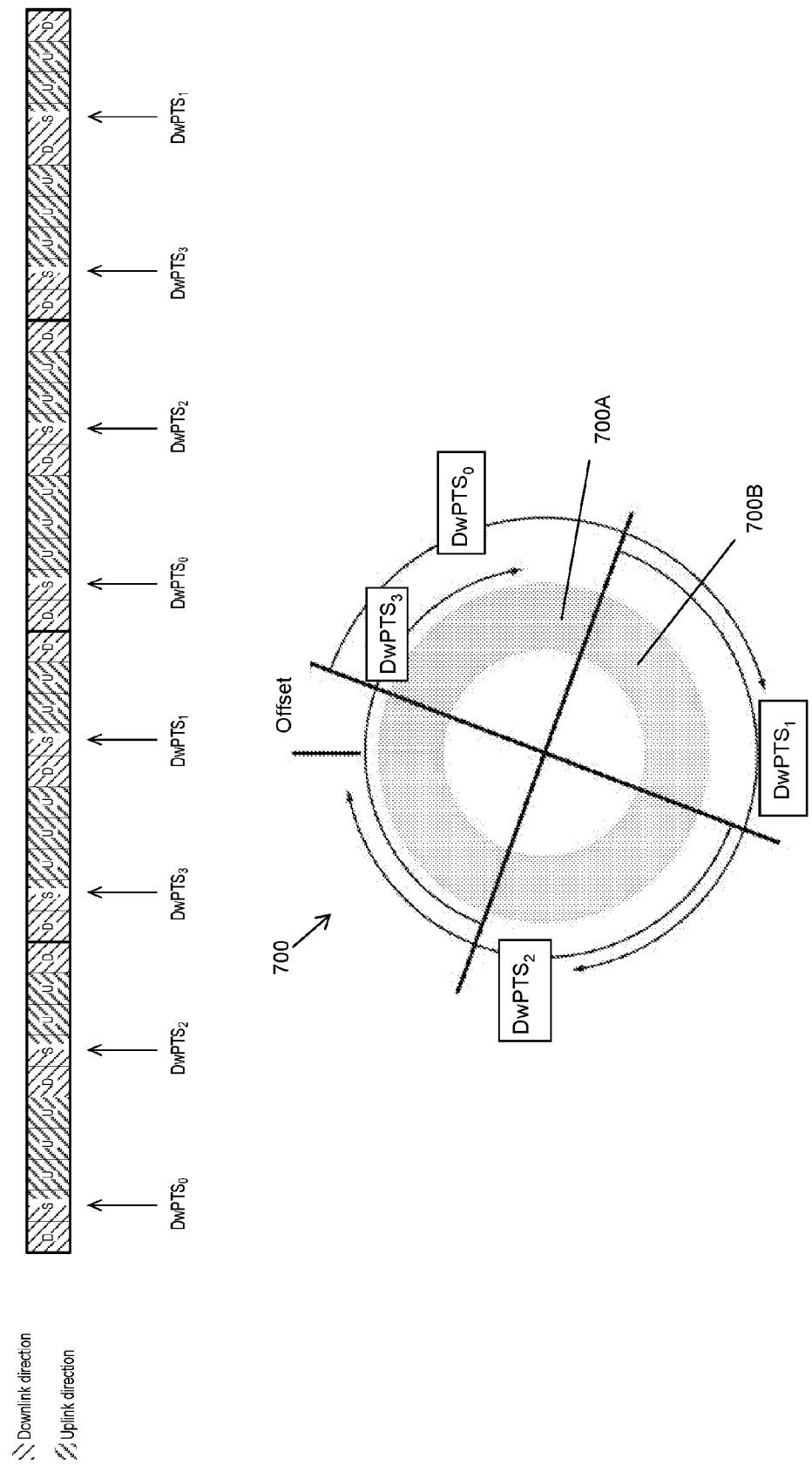
FIG. 9 is a schematic drawing illustrating another exemplary rate matching approach using special frames and downlink frames.

FIG. 9 illustrates the mapping of a control channel (the same is applicable also for a user data channel) as described above. In particular, a pointer (counter) may take four values DwPTS_0, DwPTS_1, DwPTS_2 and DwPTS_3. The incrementing of the pointer is performed for each S subframe in the predefined order of DwPTS_0, DwPTS_2, DwPTS_3 and DwPTS_1.

Accordingly, the rate matching algorithm for the control channels may be performed as illustrated by the following pseudo code:

$$\text{Set } k_0 = R_{subblock}^{CC} \cdot \left( 2 \cdot \left\lceil \frac{K_w}{8 R_{subblock}^{CC}} \right\rceil \cdot DwPTS_{idx} + \text{offset} \right)$$

Set $k = 0$ and $j = 0$ while {k<E}
  if $w_{(k_0+j) \bmod K_w} \neq$ <NULL>
    $e_k = w_{(k_0+j) \bmod K_w}$
    k=k+1
  end if
  j=j+1
end while wherein $DwPTS_{idx}$ is a counter that is incremented at each DwPTS control repetition (version) transmission and offset could be 0 for simplicity, or a different value preferably between 0 and Kw divided by the number of possible redundancy versions.

The term $R_{subblock}^{CC}$ denotes number of rows in a interleaving matrix as specified in detail within 3GPP TS 36.212, v.8.6.0 (or other version) in Section 5.1.4 and in particular in Subsection 5.1.4.1.1 for Turbo coding. The term Kw denotes the size of the coded data block, i.e., the length of the circular buffer for the coded data block. The term E denotes the rate matching output sequence length for the coded block. The term w denotes bits in the circular buffer, where the position within the buffer is given by the subscript index of w.

Multiplication by 2 and division by 8 in the first line of the pseudo code above correspond to the application of 4 possible RVs. By changing these numbers, the pseudo code may be adapted to another number of redundancy versions. It is noted that the number of redundancy versions used does not require changing the coding or producing more effective parity bits. Rather, in order to implement more RVs, more pointer values are defined. The data read out for two consecutive RVs if more RVs are configured thus potentially includes larger overlapping. Accordingly, the order of the RVs to be read out from the circular buffer may be changed to read at first the RV=0 and then the next RV with the least or no overlapping with data of RV=0, etc.

In order to comply with the existing approaches in LTE, four control channel versions for DwPTS are advantageously defined as shown above. For each DwPTS (special subframe, downlink portion) transmission, the version counter is cyclically incremented following a predefined order of the redundancy versions. For instance, if four redundancy versions 0-3 are available, the counter may be incremented modulo 4, i.e., 0, 1, 2, 3, 0, 1, 2, 3, 0, etc. . . . However, other order of the redundancy versions may be defined and cyclically repeated such as 0, 2, 1, 3, 0, 2, 1, 3, etc. or any other.

As described in the above background section, there may be different DwPTS sizes currently in LTE (cf. configurations 0 to 9), also depending on the size of the cyclic prefix applied, which is configurable.

According to an embodiment, the sequence [0,1,2,3] of redundancy versions is applied for short DwPTS and small control channel payloads and the sequence [0,2,3,1] is applied for better distribution of transmitted bits in case of long DwPTS and/or large control channel payloads.

In general, the sequence of versions for a special subframe with a first length may differ from the sequence of versions for a special subframe with a second length. The length refers to the number of bits or symbols available for mapping data thereon. Advantageously, the sequence of versions is consecutive (i.e., sequentially following the order of possible pointer positions in the circular buffer) for the first length and non-consecutive for the second length, the first length being shorter than the second length. The non-consecutive mapping helps reducing the overlapping data portions between the consecutive redundancy versions and thus provide more combining diversity which may result to a faster decoding (after less attempts).

Wireless systems and among them also LTE may employ frequency hopping in order to improve reception in frequency selective fading channels. The frequency hopping means that at certain time period, the frequency on which the data block version is to be transmitted changes in a pseudo random manner. In LTE, the change of frequency is performed by changing the location of the PRB for the given subframe. It is noted that the size of certain time period for MTC is still discussed in standardization. It may be beneficial to set the size of the certain time period to a multiple of subframes, for instance to a value from 4 to 20 subframes. Within such a range, the channel can usually be assumed as coherent in time, so that the radio channel can be assumed to be almost flat. This enables averaging of the channel quality over several subframes, resulting in a more reliable channel estimation. Nevertheless, the values 4 to 20 should be understood as exemplary and might also span more than 20 subframes provided that the radio channel can still be assumed as almost flat. In the legacy (non MTC) communication currently the frequency hopping can be performed even within a subframe or between the subframes.

Assuming that the frequency resources for control channel transmissions would hop after several radio frames, the cyclic counter (pointer) may advantageously be reset to the initial value after each hop. (The same may be applied for a user data channel). Resetting of the counter after change of resource position in frequency domain provides an advantage of avoiding possible error propagation in case of a wrong understanding at the UE side. For instance, error propagation could be caused by different understanding of the number of DwPTS within a hop, or the start of the control channel transmission.

In the following some further example variants are described for rate matching including different types and/or sizes of subframes.

The above examples were described with respect to one particular TDD UL/DL configuration. However, in general, the present disclosure is applicable to any TDD UL/DL configuration. In particular, according to a first variant, the number and the positions of redundancy versions within the circular buffer is a function of the configured DwPTS length, the number of repetitions of the channel, and/or the number of DwPTS per radio frame.

It is noted that the positions of redundancy versions within the circular buffer may be given by the offset (which may be zero) and by the number of redundancy version under the assumption that the RVs are located equidistantly (or substantially equidistantly if the size of the circular buffer is not divisible by the number of RVs) within the circular buffer. The redundancy versions are thus given by the values which the pointer can take.

The number of repetitions of the data includes all repetitions of different data versions. For instance, 50, 100 or 120 (or any other number) repetitions of a data block may be some exemplary settings for enhanced coverage. For the setting of 100 repetitions, the above exemplified four repetition versions of the data would be cyclically transmitted/received 25 times. Thus the number of repetitions of a transport block is basically equal to the number of subframes in which the transport block is carried.

The number of special subframes per radio frame is given by the TDD UL/DL configuration and in LTE currently ranges from 1 to 2. However, in general, any number may be supported.

The above settings, for instance the number of repetitions and also number of redundancy versions may differ for the shared data channel (carrying user data) and for the control channel since a different level of reliability may be beneficial for the control channels and user data channels.

For instance, assuming that the frequency resources for control channel transmissions would hop every 4 or 8 or 16 radio frames, the following numbers could be advantageous for control channels:
  4 control channel versions for hopping distance of 4 radio frames and 1 DwPTS per radio frame. This configuration is similar as shown in FIG. 9—4 redundancy versions, but only one S subframe rather than two as shown in the Figure.
  8 control channel versions for
    Hopping distance of 4 radio frames and 2 DwPTS per radio frame
    Hopping distance of 8 radio frames and 1 DwPTS per radio frame
  16 control channel versions for
    Hopping distance of 8 radio frames and 2 DwPTS per radio frame
    Hopping distance of 16 radio frames and 1 DwPTS per radio frame Since a control channel is usually smaller than 300 coded bits, a control channel version granularity finer than 10 coded bits seems unnecessary. Therefore, more than 32 control channel versions are usually not as attractive (since they could diminish returns). The term "channel version" here refers to the redundancy versions, i.e., to the number of different values which can be taken by the special subframe pointer.

Figure 10:
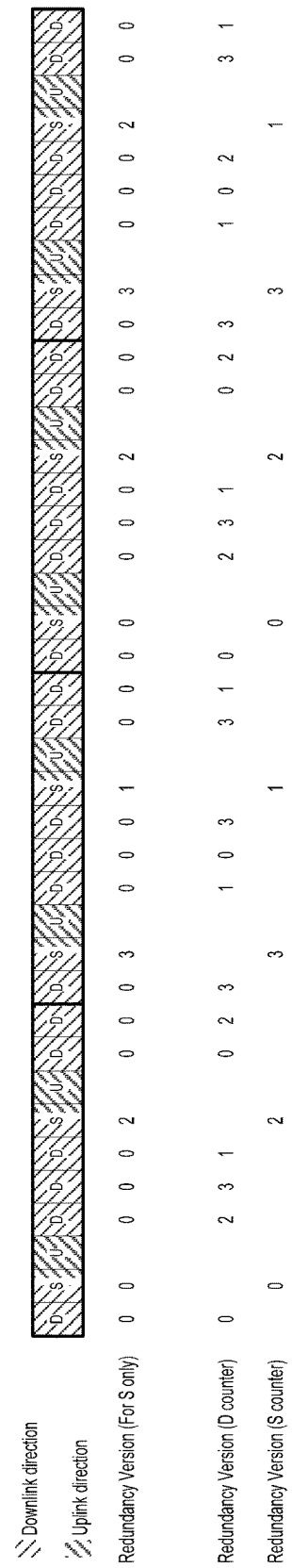
FIG. 10 is a schematic drawing illustrating usage of a counter index specific for special frames.

In accordance with a second variant, the redundancy version counters are introduced not only for special subframes but also for normal subframes (downlink or uplink). This is illustrated in FIG. 10, similarly to FIG. 8. FIG. 10 shows a comparison with the case in which the redundancy version counter (pointer) is only used for the special frames (the first line below the subframe structure).

On one hand, the redundancy version counter only for special subframes as shown in FIG. 9 is an option. In such a case, identical information is transmitted in each D subframe (for instance the systematic information with RV=0). Different RVs are transmitted in the consecutive special subframes. In this configuration, after combining there is an imbalanced repetition gain since RV=0 is much more frequent than other RVs.

Thus, for the control channels, the RV counter is advantageously introduced not just for S subframes but also for D subframes.

According to a first option, there may be a one single joint control channel version counter which is incremented for each subframe (regardless whether normal or special subframe).

According to a second option, there are two different control channel version counters: The first counter is incremented for each normal subframe and applies to normal subframes whereas the second counter incremented for each special subframe and applies to special subframe.

The second option achieves a better balance for the redundancy than the first option.

Figure 11:
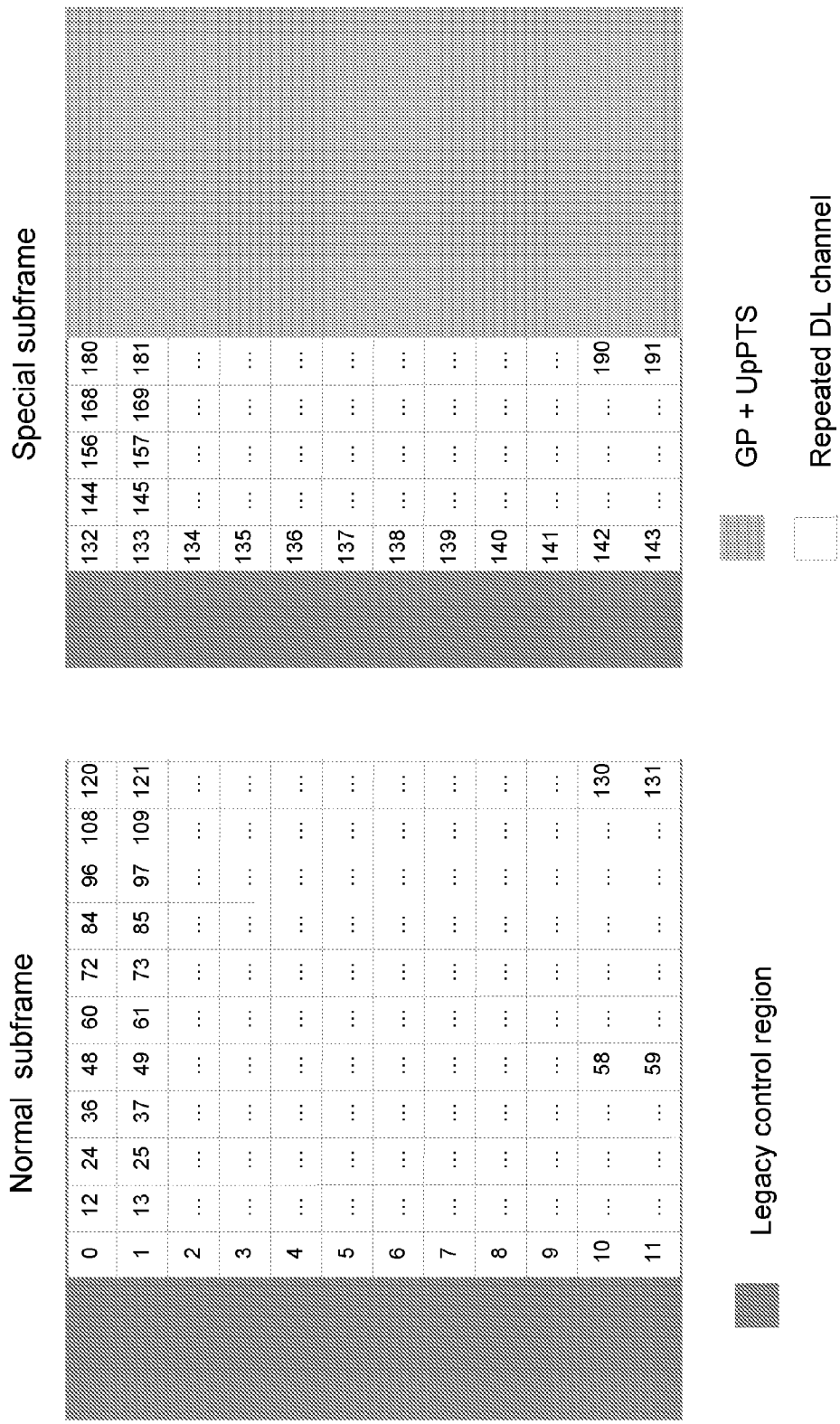
FIG. 11 is a schematic drawing illustrating an exemplary format of a downlink subframe and a special subframe.

FIG. 11 illustrates a third variant, in which the special subframe is considered together with a normal subframe for the rate matching. Accordingly, the bits (symbols) in the D and S subframes in FIG. 11 are numbered consecutively.

In the third variant, for the purposes of rate matching, the resources available in a D+S subframe are considered for the rate matching. The S subframe is thus seen as a logical continuation of a preceding D subframe. Referring to the example shown in FIG. 6, this would mean that a D+S subframe together offers 192 REs for transmission, i.e., for BPSK equivalent to 192 bits. For this variant, this implies that for this D+S subframes the RV and the corresponding starting position for mapping the coded bits from the circular buffer to the available REs in the D+S subframes are determined as for the corresponding D subframe, but mapping in this example 192 bits to the D+S subframes. The RV counter is then not increased for the S subframe of such a D+S pair, but only for the next regular D subframe. For example if RV=0 is used for the D subframe of a D+S sequence, for the next D subframe after the D+S pair RV=2 is used (assuming a cyclic RV counting sequence of 0,2,3,1). In other words, there may be a common pointer maintained for the D+S and D subframes. The value of such pointer may be incremented with each D subframe. Starting from the RV position given by the current pointer value, different number of bits is read out from the circular buffer for the D and the D+S subframes. Namely, the size of data read out from the buffer to be mapped onto a D+S resource is bigger than the size of data read out from the buffer and to be mapped onto a D subframe.

In another embodiment of this variant, there are individual pointers/counters for stand-alone D and joint D+S subframes. The value of the stand-alone D pointer would be incremented with each D subframe that is not immediately followed by an S subframe, while the joint D+S pointer would be incremented with each joint D+S subframe pair. This embodiment allows a further improved reliability averaging compared to the common pointer embodiment, which has advantages for implementations due to its simplicity.

This concept of grouping subframes into resources for rate matching may be further extended to include other D or S subframes.

This variant may be combined with some more new RVs in D subframes for better reliability averaging. For instance, instead of 4 RVs as exemplified above, 8 RVs may be defined and used for coverage enhancements. This may be advantageously employed for the case where the data size before encoding is large enough so that after encoding, the number of coded bits between two RV starting positions is larger than the number of bits that can be conveyed in one subframe. Such a scenario can particularly occur if only few REs are available for transmission in a subframe, such as in a very short DwPTS configuration (such as DwPTS configuration 0) and/or the assignment of only one physical resource block per subframe. For example when DwPTS configuration 0 is applicable, the overall downlink capacity is equivalent to 3 OFDM symbols in time domain. If two of those are occupied by control channel data such as PDCCH, it means that only one OFDM symbol for downlink data remains, equivalent to 12 REs per assigned physical resource block. If furthermore only one physical resource block is assigned and QPSK modulation is employed, only 24 coded bits per DwPTS can be transmitted. For a data block of 96 information bits encoded to 288 bits for the circular buffer, a partitioning offering optimum reliability averaging would mean that (288/24=12) different transmission versions would be defined. Optimum reliability averaging together with the maximum coding gain can then be achieved by transmitting the 12 different transmission versions in 12 such DwPTS occasions. A general criterion for this variant could therefore be to determine the number of defined RVs in accordance with the number of encoded bits in the circular buffer and the offered capacity of a DwPTS assignment, which may further be adjusted up or down to match the next larger or smaller number that is advantageously an integer power of 2 for efficient signaling of the transmitted RV.

Figure 12:
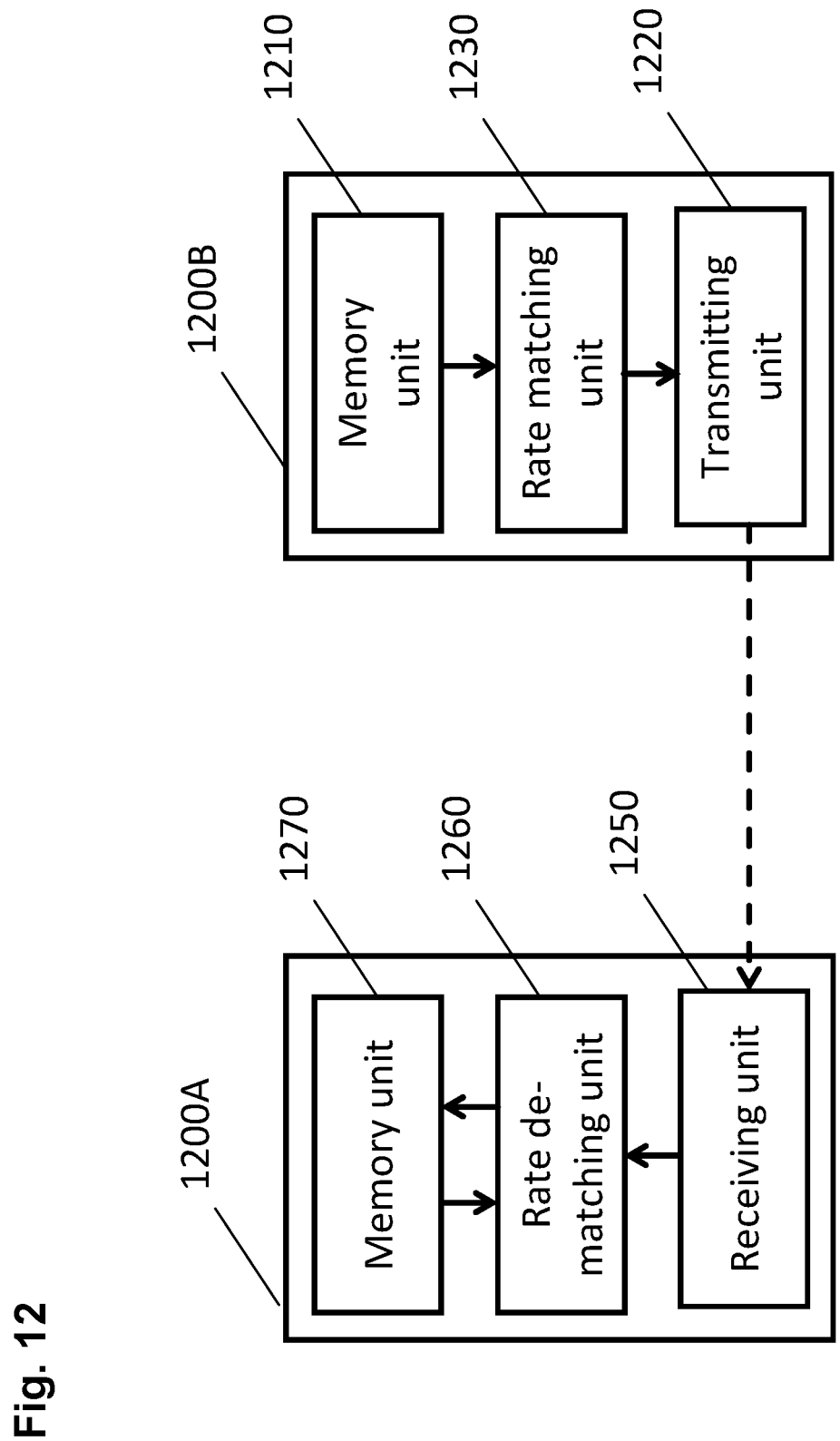
FIG. 12 is a block diagram illustrating an exemplary transmitter and a receiver implementing the rate matching for an MTC channel.

The present invention may provide the following benefits:
Better balance among bits, i.e., how often the bits are repeated within a repetition cycle,
The improved balance results in a better decoding/detection performance of the channel, which may lead to fewer required overall repetitions, creating more time-domain radio resources e.g., for other users in the cell, and
For repetitions within a frequency hopping interval, the bits are distributed and therefore less vulnerable against very narrowband interference signals FIGS. 12 and 13 illustrate the embodiments of the present invention as apparatuses and methods, respectively.

In summary, the present disclosure provides an apparatus 1200B for transmitting data in a wireless communication system employing time division duplex. The apparatus may advantageously be a network node such as a base station (eNodeB in LTE) which transmits data in downlink. However, the present disclosure is not limited thereto and the apparatus may alternatively be a wireless device such as a user equipment transmitting data in uplink. As is clear to those skilled in the art, the apparatus may integrate functionality of both the apparatus for transmitting and apparatus for receiving data according to the present disclosure, which may be applicable for instance for wireless devices working as relays and/or hops on a multimode network.

The apparatus 1200B comprises a memory unit 1210 for storing a data block and to be operated as a circular buffer; a transmission unit 1220 for transmitting the data block in a plurality of subframes including special subframes, a special subframe containing an uplink portion and a downlink portion separated from each other by a switching portion; and a rate matching unit 1230 for mapping the stored data block onto the plurality of subframes using the circular buffer, wherein the mapping of bits onto two different special subframes starts from different respective positions in the circular buffer.

The memory unit 1210 may be operated as a circular buffer. In particular, the apparatus may further comprise a pointer storage for storing a pointer indicating a position within the circular buffer. The pointer storage may be a part of the memory unit 1210. The pointer may take several values corresponding to different positions within the circular buffer storing the data block to be transmitted. In particular, the positions may be substantially equally distributed over the buffer. At each mapping to a subframe, the pointer is incremented to point to the next position from which the data is to be read from the circular buffer. If the pointer reaches the last of the positions, the following incrementing shall lead to the first position again, i.e., the incrementing is performed cyclically (modulo number of positions).

These positions define start of the corresponding respective redundancy versions which are versions of the data in the cyclical buffer which are mapped to the respective different subframes. The length of the data portion to be mapped depends on the length of the subframe, in particular on the number of bits or symbols which can be mapped thereon. In particular, special subframes have a length different from the length of the other subframes.

Advantageously, there is a special subframe pointer indicating a position from which the data from the circular buffer are read and mapped onto a special subframe and which is incremented for each subframe into which the data is mapped from the circular buffer.

A separate pointer (not incremented/maintained for subframes other than special subframes such as downlink and uplink subframes) for special subframes provides the advantage that even if the number of redundancy versions corresponds to periodicity of the special subframes, the redundancy version of the data mapped onto the special subframes will change, which reduces the imbalance otherwise caused by more frequent mapping of the same redundancy version (or versions) onto the special subframes which have a shorter length than the remaining subframes.

The present disclosure is not limited to transmitting as different versions of the data different parity bits generated by the forward error correction coder. The different versions of the data may be also repetitions (after coding, or uncoded data with repetitions of bits or symbols) or other versions.

Nevertheless, according to an embodiment, the data block to be stored in the memory unit is a coded data block comprising a plurality of versions of the same data. Then, after mapping of data from the circular buffer onto a special subframe the special subframe pointer is incremented to point to the version of the data that is to be mapped onto a subsequent (next following) special subframe.

The data block in the circular buffer may include systematic portion and a number, N, of versions with parity bits, N being an integer equal to or greater than 1. The data block may e.g., be coded by the Turbo code specified currently for LTE. However the present disclosure is not limited thereto and the data block may be coded by a non-systematic encoder so that different redundancy versions do not include any systematic part. For instance, the data block may be coded by a convolutional code as currently defined for the LTE.

Advantageously, the pointer storage is configured to further store a downlink subframe pointer indicating a bit position within the circular buffer and different from the special subframe pointer, wherein the downlink subframe pointer indicates a position from which the data from the circular buffer are read and mapped onto a downlink subframe and is incremented for each subframe where data is mapped from the circular buffer onto a downlink subframe.

Maintaining of separate pointers for the downlink subframes and the special subframes helps reducing the imbalance between the frequency of mapping different data block portions onto the subframes. It is noted that even if the pointers are different, the positions defined as the values which can be taken by the pointer may be the same for the downlink frames and the special frames. However, the present invention is not limited thereto and the positions may also differ for the special subframes and the downlink subframes. The difference may be achieved, for instance by a different offset applied or in another way.

According to another embodiment, the pointer is also incremented after mapping of the data to other than special subframes.

This approach may also lead to a good balance for some configurations of a number of redundancy versions and special subframe frequency. Accordingly, there is a common pointer for the subframes irrespectively of whether they are special or downlink.

The wireless communication system may support frequency hopping. Thus, the apparatus may be further comprising a frequency hopping unit which is configured to control the change of transmitted frequency resources on which the data in subframes is transmitted, wherein the rate matching unit is configured to set the pointer to the same predetermined position after each change of the frequency resource.

In particular the frequency hopping may be implemented as physical resource block hopping. The hopping is advantageously performed after a multiple of subframes, for instance after 4 to 20 subframes. However, this is merely a non-limiting example which may be advantageous in view of channel estimation.

According to another embodiment, the special subframe pointer indicates a position from which the data from the circular buffer are read and mapped onto a joint resource formed by a downlink subframe and a special subframe immediately following the downlink subframe and is incremented at each mapping of data from the circular buffer onto the joint resource as well as onto downlink subframes.

Accordingly, the special subframes are not considered as separate resources. Rather, the immediately preceding downlink subframe is considered to be extended by the downlink portion of the special subframe. In other words the joint resource composed of the D and S subframe is treated as a subframe.

It is noted that all above described embodiments and examples may easily be adapted to uplink. In such case, the control data or user data may be transmitted in uplink portion of the special subframes and in uplink subframes. In the embodiment with joint resource formed by a normal subframe and a special subframe, the joint resource could be beneficially formed by an uplink portion of a special subframe and the next following uplink subframe.

Advantageously, the pointer is incremented cyclically, sequentially following a predefined sequence of data versions, and the predefined sequence of data versions is different for different lengths of special subframes.

In particular, the special subframes may have a different length in terms of available bits for mapping the user data or control data. In LTE, the special subframe length is configurable as shown above.

The present disclosure also provides an apparatus 1200B for transmitting control data in a wireless communication system the apparatus comprising: a memory unit 1210 for storing a control data block and to be operated as a circular buffer; a transmission unit 1230 for transmitting the control data block in a plurality of subframes; and a rate matching unit 1220 for mapping the control data block onto the plurality of subframes using a circular buffer, wherein the mapping of bits onto two different subframes starts from different respective positions in the circular buffer.

Accordingly, the rate matching employing circular buffer may be used for control channels. The circular buffer differs from the circular buffers used in conjunction with HARQ in particular in that the number of repetitions may include not only the number of redundancy versions (pointer positions) defined but may cyclically extend (after the pointer reaches the last position, the incrementing results in starting with the first position again). This circular buffer implementation is particularly suitable for MTC like deployments in which a large number of repetitions may be configured to enhance coverage.

The present disclosure further provides the corresponding apparatuses which are configured to receive data transmitted by transmission apparatuses described above. For instance an apparatus 1200A is provided for receiving data in a wireless communication system employing time division duplex. Such apparatus may be for instance a wireless device receiving a downlink transmission such as a user equipment (UE) of any kind, for instance a mobile phone, smart phone, tablet, computer or any device capable of receiving data over the wireless interface. However, the apparatus may also be a network node such as a base station receiving in uplink. As described above, apparatuses implementing both the receiving and the transmitting function according to the present disclosure may be for instance wireless devices in the multi-hop network, wireless devices serving as relays and the like.

The apparatus for receiving data according to an embodiment comprises a receiving unit 1250 for receiving the data block in a plurality of subframes including special subframes, a special subframe containing an uplink portion and a downlink portion separated from each other by a switching portion; a memory unit 1270 for storing data block versions received; and a rate de-matching unit 1260 for extracting (de-mapping) the data block from the plurality of subframes into the memory unit using a circular buffer approach, wherein the de-mapping of bits from two different special subframes leads to different respective positions in the memory unit.

The apparatus may further comprise a combining unit for combining different data versions received and stored in the memory unit in accordance with the rate de-matching. The combining may be for instance a soft combining. However, the present disclosure is not limited thereto and in general any kind of combining may be implemented. The combining may be performed for different redundancy versions as well as repetitions of different redundancy versions.

The apparatus may further comprise a pointer storage for storing a special subframe pointer indicating a bit position within the circular buffer, wherein the pointer indicates a position in the memory unit to which the data from a special subframe are de-mapped and is incremented for each special subframe from which the data is de-mapped to the memory unit.

For instance, the data block to be stored in the memory unit is a coded data block comprising a plurality of versions of the same data, and according to an embodiment, after the de-mapping of data from a special subframe to the memory unit, the special subframe pointer is incremented to point to the version of the data that is to be de-mapped from the subsequent special subframe.

The pointer storage may be configured to further store a downlink subframe pointer indicating a bit position within the circular buffer and different from the special subframe pointer, wherein the downlink pointer indicates a position in the memory unit to which the data from a downlink subframe are de-mapped and is incremented for each downlink subframe from which the data is de-mapped to the memory unit.

Alternatively, the special subframe pointer may also be incremented after mapping of the data to other than special subframes. For instance, the subframe pointer may be updated for downlink transmission for each downlink and each special subframe.

The apparatus may further comprise a frequency hopping unit which is configured to control the change of received frequency resources on which the data in subframes is received, wherein the rate de-matching unit is configured to set the pointer to the same predetermined position after each change of the frequency resource.

According to an embodiment, the special subframe pointer indicates a position to which the data are written to the memory unit, de-mapped from a joint resource formed by a downlink subframe and a special subframe immediately following the downlink subframe; and the special subframe pointer is incremented at each de-mapping of data from the joint resource as well as from each downlink subframe to the memory unit.

Advantageously, the pointer (any of the above mentioned pointers such as special subframe pointer, downlink subframe pointer or joint D+S pointer, or even an uplink pointer or a joint S+U pointer) is incremented cyclically, sequentially following a predefined sequence of data versions, and the predefined sequence of data versions is different for different lengths of special subframes.

The present disclosure also provides an apparatus for receiving control data in a wireless communication system the apparatus comprising: a receiving unit for receiving the control data block in a plurality of subframes; a memory unit for storing a control data block received; a rate de-matching unit for extracting the control data block from the plurality of subframes into the memory unit using a circular buffer approach, wherein the de-mapping of bits from two different subframes leads to different respective positions in the memory unit.

The present disclosure further provides the corresponding methods for transmitting and receiving data in a wireless communication system.

In particular, a method 1300A is provided for transmitting data in a wireless communication system employing time division duplex. The method comprises the following steps: storing 1310 a data block in a memory unit to be operated as a circular buffer; mapping 1320 the stored data block onto a plurality of subframes using circular buffer approach, wherein the mapping of bits onto two different special subframes starts from different respective positions in the circular buffer; and transmitting 1340 the data block in the plurality of subframes including special subframes, a special subframe containing an uplink portion and a downlink portion separated from each other by a switching portion.

The step of storing may correspond for instance to receiving a transport block after forward error correction coding and temporarily storing it in a memory which is to be operated as a circular buffer (for instance by means of cyclically updating pointer at each new subframe to which the data is mapped). The step of updating the pointer 1330 may be performed within the rate matching and may include as described above and with respect to apparatuses updating of any of the special subframe pointer, downlink subframe pointer, uplink subframe pointer, joint D+S or S+U pointer or a common pointer, whichever is applicable according to the embodiments and examples described above.

The transmission is performed over a wireless interface 1300, which may be for instance the wireless interface often LTE system or any other system.

Moreover, a method 1300A is provided for transmitting control data in a wireless communication system the method comprising: storing 1320 a control data block in a memory unit to be operated as a circular buffer; mapping 1320 the control data block onto a plurality of subframes using a circular buffer, wherein the mapping of bits onto two different subframes starts from different respective positions in the circular buffer; and transmitting 1340 the control data block in the plurality of subframes.

Furthermore, a method 1300B is provided for receiving data in a wireless communication system employing time division duplex, the method comprising: receiving 1350 the data block in a plurality of subframes including special subframes, a special subframe containing an uplink portion and a downlink portion separated from each other by a switching portion; storing 1380 in a memory unit data block versions received; extracting 1360 the data block from the plurality of subframes into the memory unit using a circular buffer approach, wherein the de-mapping of bits from two different special subframes leads to different respective positions in the memory unit.

This method can be used for receiving of the data transmitted by the above described transmission method. The rate de-matching step 1360 extracts the data from the received subframes and provides them to the storing step together with the appropriate position for storing in accordance with the cycling buffer approach. In particular, the rate the matching step ensures that the data received from respective subframes corresponding to respective versions of the data block are stored in the correct position to be decoded and/or combined in step 1380. Is also described above the pointer may be updated 1370.

Step 1380 includes combining of different versions of data which may be a soft combining or another kind of combining of repetitions as well as combining of different incremental redundancy versions. Step 1380 may further include attempting to decode combined versions of data, checking whether the decoding was successful (for instance by checking the CRC) and handling accordingly. This handling may include stopping the reception of further versions of the data in order to save battery power if the data could be decoded successfully. On the other hand, if the data could not be decoded successfully, method 1300B is continuously executed, i.e., subframes carrying the data are received 1350, rate de-matching is performed 1360 and the received data is stored 1380. Decoding attempts may be performed after receiving each subframe or after receiving multiple subframes.

Moreover, a method is provided for receiving control data in a wireless communication system the method comprising: receiving the control data block in a plurality of subframes; storing in a memory unit a control data block received; extracting the control data block from the plurality of subframes into the memory unit using a circular buffer approach, wherein the de-mapping of bits from two different subframes leads to different respective positions in the memory unit.

In accordance with another embodiment, a computer program product comprising a computer-readable medium having a computer-readable program code embodied thereon is provided, the program code being adapted to carry out the present invention.

Other exemplary embodiments relate to the implementation of the above described various embodiments using hardware and software. In this connection a user terminal (mobile terminal) and an eNodeB (base station) are provided. The user terminal and base station is adapted to perform the methods described herein, including corresponding entities to participate appropriately in the methods, such as receiver, transmitter, processors.

It is further recognized that the various embodiments may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments may also be performed or embodied by a combination of these devices.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

Summarizing, the present invention relates to transmitting and receiving data in a wireless communication system employing time division duplex, and in particular to a rate matching for the channels which are mapped onto special subframes such as uplink/downlink switching subframes in TDD. Accordingly, at the transmitter, a data block is stored in a memory unit which is to be operated as a circular buffer, the data block is transmitted in a plurality of subframes including special subframes, a special subframe containing an uplink portion and a downlink portion separated from each other by a switching portion; and before the transmission a rate matching is performed by mapping the stored data block onto the plurality of subframes using the circular buffer, wherein the mapping of bits onto two different special subframes starts from different respective positions in the circular buffer. Moreover, a corresponding receiving apparatus and a transmitting and receiving method are provided.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An apparatus for transmitting data in a wireless communication system employing time division duplex, the apparatus comprising:
a memory, which, in operation, stores a data block, the memory being operated as a circular buffer;
a transmitter, which, in operation, transmits the data block in a plurality of subframes including special subframes, a special subframe containing an uplink portion and a downlink portion separated from each other by a switching portion; and
circuitry, which, in operation, maps the stored data block onto the plurality of subframes using the circular buffer, wherein mapping of bits onto a first special subframe starts from a first position in the circular buffer, mapping of bits onto a second special subframe subsequent to the first special subframe starts from a second position in the circular buffer, and the second position is determined based on the first position.

2. The apparatus according to claim 1 further comprising a pointer storage for storing a special subframe pointer indicating a bit position within the circular buffer,
wherein the pointer indicates a position from which data from the circular buffer are read and mapped onto a special subframe and is incremented for each subframe where data is mapped from the circular buffer onto a special subframe.

3. The apparatus according to claim 1, wherein the data block to be stored in the memory is a coded data block comprising a plurality of versions of the same data, and
after mapping of data from the circular buffer onto a special subframe, a special subframe pointer is incremented to point to a version of the data that is to be mapped onto a subsequent special subframe.

4. The apparatus according to claim 2, wherein the pointer storage is configured to further store a downlink subframe pointer indicating a bit position within the circular buffer and different from the special subframe pointer,
wherein the downlink subframe pointer indicates a position from which the data from the circular buffer are read and mapped onto a downlink subframe and is incremented for each subframe where data is mapped from the circular buffer onto a downlink subframe.

5. The apparatus according to claim 2 wherein the special subframe pointer is also incremented after mapping of the data to other than special subframes.

6. The apparatus according to claim 1 wherein the circuitry, in operation, controls a change of transmitted frequency resources on which data in subframes is transmitted, and sets a pointer to the same predetermined position after each change of the frequency resource.

7. The apparatus according to claim 2 wherein the special subframe pointer indicates a position from which the data from the circular buffer are read and mapped onto a joint resource formed by a downlink subframe and a special subframe immediately following the downlink subframe, and is incremented at each mapping of data from the circular buffer onto the joint resource as well as onto downlink subframes.

8. The apparatus according to claim 2, wherein
the pointer is incremented cyclically, sequentially following a predefined sequence of data versions, and
the predefined sequence of data versions is different for different lengths of special subframes.

9. An apparatus for transmitting control data in a wireless communication system the apparatus comprising:
a memory, which, in operation, stores a control data block, the memory being operated as a circular buffer;
a transmitter, which, in operation, transmits the control data block in a plurality of subframes; and
circuitry, which, in operation, maps the control data block onto the plurality of subframes using a circular buffer, wherein mapping of bits onto a first subframe starts from a first position in the circular buffer, mapping of bits onto a second subframe subsequent to the first subframe starts from a second position in the circular buffer, and the second position is determined based on the first position.

10. An apparatus for receiving data in a wireless communication system employing time division duplex, the apparatus comprising:
- a receiver, which, in operation, receives a data block in a plurality of subframes including special subframes, a special subframe containing an uplink portion and a downlink portion separated from each other by a switching portion;
- a memory, which, in operation, stores data block versions received;
- circuitry, which, in operation, extracts the data block from the plurality of subframes into the memory using a circular buffer approach, wherein de-mapping of bits from two different special subframes leads to different respective positions in the memory unit; and
- a pointer storage, which, in operation, stores a special subframe pointer, wherein the pointer indicates a position in the memory to which data from a special subframe are de-mapped, and is incremented for each special subframe from which data is de-mapped to the memory.

11. The apparatus according to claim 10, wherein the data block to be stored in the memory is a coded data block comprising a plurality of versions of the same data, and
- after de-mapping of data from a special subframe to the memory unit, the special subframe pointer is incremented to point to a version of the data that is to be de-mapped from the subsequent special subframe.

12. The apparatus according to claim 10, wherein the pointer storage is configured to further store a downlink subframe pointer indicating a bit position within the circular buffer and different from the special subframe pointer,
- wherein the downlink pointer indicates a position in the memory unit to which the data from a downlink subframe are de-mapped and is incremented for each downlink subframe from which the data is de-mapped to the memory unit.

13. The apparatus according to claim 10 wherein the special subframe pointer is also incremented after mapping of data to other than special subframes.

14. The apparatus according to claim 10 wherein the circuitry, in operation, controls a change of received frequency resources on which data in subframes is received, and sets the pointer to the same predetermined position after each change of the frequency resource.

15. The apparatus according to claim 10 wherein the special subframe pointer indicates a position to which the data are written to the memory, and de-mapped from a joint resource formed by a downlink subframe and a special subframe immediately following the downlink subframe; and the special subframe pointer is incremented at each de-mapping of data from the joint resource as well as from each downlink subframe to the memory unit.

16. The apparatus according to claim 10, wherein
- the pointer is incremented cyclically, sequentially following a predefined sequence of data versions, and
- the predefined sequence of data versions is different for different lengths of special subframes.

17. An apparatus for receiving control data in a wireless communication system the apparatus comprising:
- a receiver, which, in operation, receives a control data block in a plurality of subframes;
- a memory, which, in operation, stores the control data block received;
- circuitry, which, in operation, extracts the control data block from the plurality of subframes into the memory using a circular buffer approach, wherein de-mapping of bits from two different subframes leads to different respective positions in the memory unit; and
- a pointer storage, which, in operation, stores a special subframe pointer, wherein the pointer indicates a position in the memory to which control data from a special subframe are de-mapped, and is incremented for each special subframe from which control data is de-mapped to the memory.

18. A method for transmitting data in a wireless communication system employing time division duplex, the method comprising:
- storing a data block in a memory to be operated as a circular buffer;
- mapping the stored data block onto a plurality of subframes using the circular buffer, wherein mapping of bits onto a first special subframe starts from a first position in the circular buffer, mapping of bits onto a second special subframe subsequent to the first special subframe starts from a second position in the circular buffer, and the second position is determined based on the first position; and
- transmitting the data block in the plurality of subframes including special subframes, a special subframe containing an uplink portion and a downlink portion separated from each other by a switching portion.

19. A method for transmitting control data in a wireless communication system the method comprising:
- storing a control data block in a memory to be operated as a circular buffer;
- mapping the control data block onto a plurality of subframes using the circular buffer, wherein mapping of bits onto a first subframe starts from a first position in the circular buffer, mapping of bits onto a second subframe subsequent to the first subframe starts from a second position in the circular buffer, and the second position is determined based on the first position; and
- transmitting the control data block in the plurality of subframes.

20. A method for receiving data in a wireless communication system employing time division duplex, the method comprising:
- receiving a data block in a plurality of subframes including special subframes, a special subframe containing an uplink portion and a downlink portion separated from each other by a switching portion;
- storing, in a memory, data block versions received;
- extracting the data block from the plurality of subframes into the memory using a circular buffer approach, wherein de-mapping of bits from two different special subframes leads to different respective positions in the memory unit;
- storing, in a pointer storage, a special subframe pointer, wherein the pointer indicates a position in the memory to which data from a special subframe are de-mapped; and
- incrementing the special subframe pointer for each special subframe from which data is de-mapped to the memory.

21. A method for receiving control data in a wireless communication system the method comprising:
- receiving a control data block in a plurality of subframes;
- storing, in a memory, a control data block received;
- extracting the control data block from the plurality of subframes into the memory using a circular buffer approach, wherein de-mapping of bits from two different subframes leads to different respective positions in the memory unit;

storing, in a pointer storage, a special subframe pointer, wherein the pointer indicates a position in the memory to which control data from a special subframe are de-mapped; and incrementing the special subframe pointer for each special subframe from which control data is de-mapped to the memory.

* * * * *